US009083551B2

(12) United States Patent  
Khanna et al.

(10) Patent No.: US 9,083,551 B2
(45) Date of Patent: *Jul. 14, 2015

(54) METHOD AND APPARATUS FOR MEDIA DISTRIBUTION USING VPLS IN A RING TOPOLOGY

(75) Inventors: Sanjay Khanna, Fremont, CA (US); Ravi Medikonda, San Ramon, CA (US); Granville D. Dillon, Sunnyvale, CA (US)

(73) Assignee: Tellabs Operations, Inc., Naperville, IL (US)

( * ) Notice: Subject to any disclaimer, the term of this patent is extended or adjusted under 35 U.S.C. 154(b) by 2175 days.

This patent is subject to a terminal disclaimer.

(21) Appl. No.: 11/413,136

(22) Filed: Apr. 27, 2006

(65) Prior Publication Data
US 2007/0220175 A1    Sep. 20, 2007

Related U.S. Application Data

(60) Provisional application No. 60/783,619, filed on Mar. 17, 2006.

(51) Int. Cl.
*H04L 12/723* (2013.01)
*H04L 29/08* (2006.01)
*H04L 29/14* (2006.01)
(Continued)

(52) U.S. Cl.
CPC ............... *H04L 12/42* (2013.01); *H04L 45/22* (2013.01); *H04L 45/28* (2013.01); *H04L 45/50* (2013.01); *H04L 67/1095* (2013.01); *H04L 69/40* (2013.01)

(58) Field of Classification Search
CPC ....... H04L 45/28; H04L 12/437; H04L 12/42; H04L 69/40; H04L 67/1095

USPC ........................... 709/201, 251; 370/216–228
See application file for complete search history.

(56) References Cited

U.S. PATENT DOCUMENTS 4,894,825 A * 1/1990 Kobayashi et al. ........... 370/226
5,113,398 A   5/1992 Howes
(Continued)

OTHER PUBLICATIONS

L.E. Miller, "Catalog of Network Connectivity Models", http://w3.antd.nist.gov/wctg/netanal/netanal_netmodels.html#RING-MESH, Jan. 15, 2003.*

(Continued)

*Primary Examiner* — Scott Beliveau
*Assistant Examiner* — Alexander Q Huerta
(74) *Attorney, Agent, or Firm* — Hamilton Brook Smith & Reynolds, P.C.

(57) ABSTRACT

A method or corresponding apparatus is employed for distributing media on a ring network. Multiple nodes and communications links are configured to distribute media in the ring network. Distribution of the media is disabled on a communications link between a selected pair of adjacent nodes in the ring network in a manner maintaining communications between the selected pair of adjacent nodes other than for distribution of the media. This configuration results in a "horseshoe" topology of the ring network with respect to the media, where distribution of the media on the ring network occurs in one or two downstream directions from head-end ingress node(s) on the ring network. Virtual Private LAN Service (VPLS) may be employed to transport the media. In an event of a link or node failure, the disabled link is enabled, allowing for continued distribution of the media with network recovery in a timeframe typically unobservable by an end user.

31 Claims, 22 Drawing Sheets

(51) Int. Cl.
*H04L 12/42* (2006.01)
*H04L 12/707* (2013.01)
*H04L 12/703* (2013.01)

(56) References Cited

U.S. PATENT DOCUMENTS

| | | | |
|---|---|---|---|
| 5,307,353 | A | 4/1994 | Yamashita et al. |
| 5,461,608 | A | 10/1995 | Yoshiyama |
| 5,949,755 | A | 9/1999 | Uphadya et al. |
| 6,259,837 | B1 | 7/2001 | deBoer et al. |
| 6,430,700 | B1 | 8/2002 | Daruwall et al. |
| 6,530,032 | B1 * | 3/2003 | Shew et al. ............. 714/4 |
| 6,532,088 | B1 | 3/2003 | Dantu et al. |
| 6,650,618 | B1 | 11/2003 | Peng et al. |
| 6,657,952 | B1 | 12/2003 | Shiragaki et al. |
| 6,711,125 | B1 | 3/2004 | Walrand et al. |
| 6,725,274 | B1 | 4/2004 | Slik |
| 6,728,220 | B2 * | 4/2004 | Behzadi ............. 370/254 |
| 6,865,149 | B1 * | 3/2005 | Kalman et al. ......... 370/225 |
| 6,992,978 | B1 | 1/2006 | Humblet et al. |
| 6,996,065 | B2 | 2/2006 | Kodialam et al. |
| 7,197,008 | B1 | 3/2007 | Shabtay et al. |
| 7,209,975 | B1 | 4/2007 | Zang et al. |
| 7,355,965 | B2 * | 4/2008 | Griswold et al. ........ 370/216 |
| 7,385,917 | B1 * | 6/2008 | Mo et al. ............. 370/216 |
| 7,388,828 | B2 * | 6/2008 | Nakash ............. 370/218 |
| 7,406,032 | B2 | 7/2008 | Li et al. |
| 2002/0118636 | A1 | 8/2002 | Phelps et al. |
| 2002/0163682 | A1 | 11/2002 | Su et al. |
| 2003/0147344 | A1 * | 8/2003 | Stewart et al. ............. 370/216 |
| 2004/0005152 | A1 | 1/2004 | Horachi et al. |
| 2005/0201273 | A1 | 9/2005 | Shimizu |
| 2006/0067243 | A1 | 3/2006 | Bejerano et al. |
| 2006/0109802 | A1 * | 5/2006 | Zelig et al. ............. 370/258 |
| 2006/0256712 | A1 | 11/2006 | Imajuku et al. |
| 2007/0070883 | A1 * | 3/2007 | Lysne et al. ............. 370/218 |
| 2007/0217331 | A1 * | 9/2007 | Khanna et al. ............. 370/224 |
| 2007/0220175 | A1 | 9/2007 | Khanna et al. |
| 2007/0223371 | A1 * | 9/2007 | Kinoshita et al. ............. 370/223 |
| 2007/0253330 | A1 * | 11/2007 | Tochio et al. ............. 370/222 |
| 2008/0037988 | A1 * | 2/2008 | Bullock ............. 398/59 |
| 2008/0285442 | A1 * | 11/2008 | Bruckman et al. ............. 370/225 |

OTHER PUBLICATIONS

U.S. Office Action dated Dec. 12, 2008 for U.S. Appl. No. 11/413,135.
U.S. Office Action dated Jul. 27, 2009 for U.S. Appl. No. 11/413,135.
U.S. Advisory Action dated Oct. 30, 2009 for U.S. Appl. No. 11/413,135.
U.S. Office Action dated Mar. 25, 2010 for U.S. Appl. No. 11/413,135.
Notice of Allowance, U.S. Appl. No. 11/413,135, dated Aug. 24, 2010.

* cited by examiner

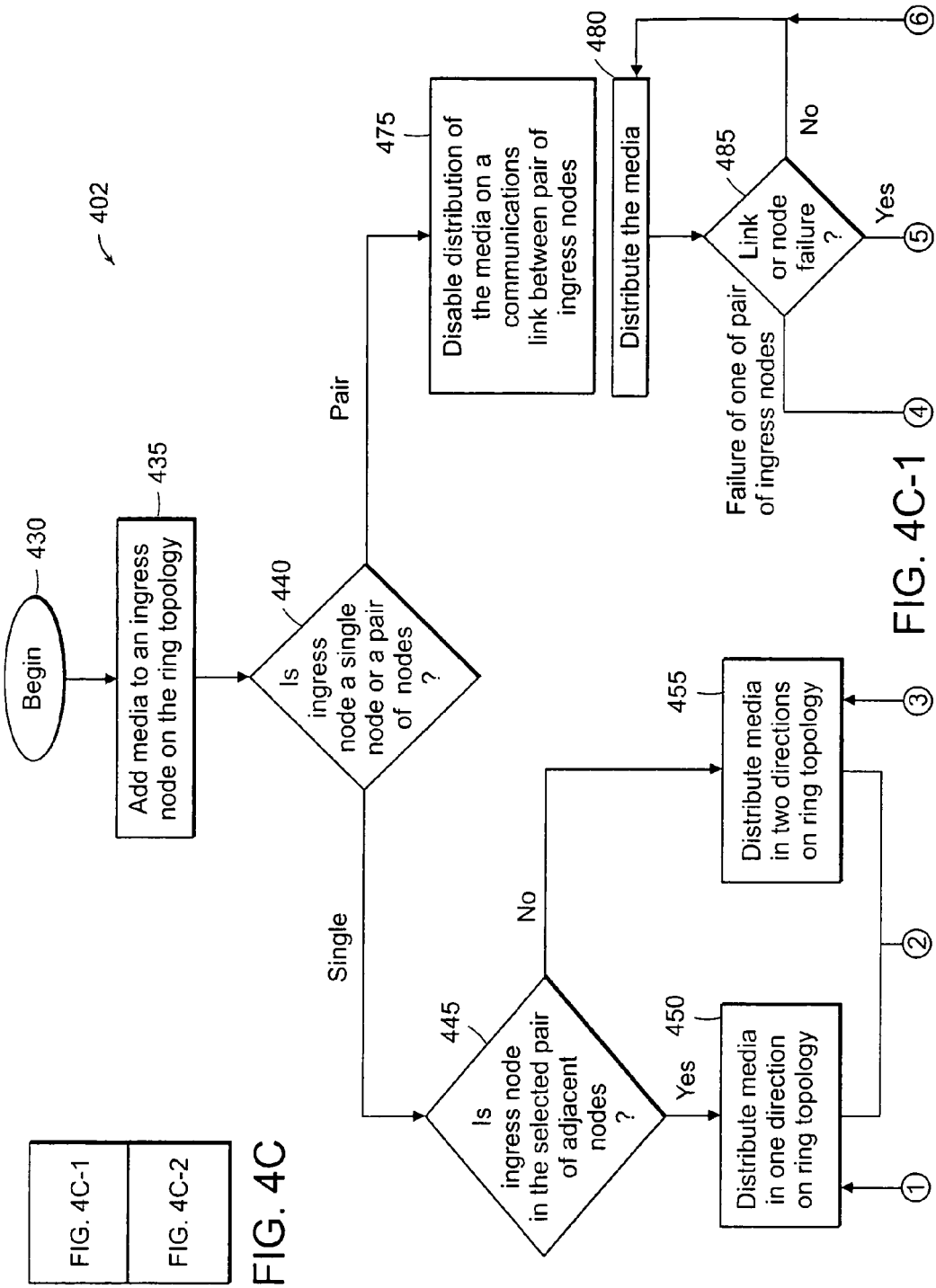

METHOD AND APPARATUS FOR MEDIA DISTRIBUTION USING VPLS IN A RING TOPOLOGY

RELATED APPLICATION

This application claims the benefit of U.S. Provisional Application No. 60/783,619, filed on Mar. 17, 2006. The entire teachings of the above application are incorporated herein by reference.

BACKGROUND OF THE INVENTION

Two useful attributes for media service delivery, such as video service delivery, are network quality and high-availability. On today's Hybrid Fiber Coaxial (HFC) networks, this is achieved because the technology deployed is mature and the network is largely dedicated to just a single function—media service delivery. However, when moving the media services into a Packet Switched Network (PSN) arena, achieving high levels of service quality and availability becomes a challenging task.

Today's HFC video networks are, in general, very scaleable. Several million customers are serviced from large-scale head-end installations, which then feed distribution networks for user access. To compete with HFC networks, an Internet Protocol (IP) video network must be capable of scaling to a similar capacity. In a typical network architecture, devices must be able to scale from a few hundred users in the early stages of implementation to multiple-millions of users at the peak of the service deployment. Additionally, in typical situations, it becomes necessary to add other services, such as voice and high-speed data, when a decision is made to provide a "triple-play" offering. All this must be accomplished without compromising the reliability, quality, manageability, or serviceability of the network.

SUMMARY OF THE INVENTION

An embodiment of the present invention includes a method or corresponding apparatus of distributing media on a ring topology communications network. Multiple nodes and communications links are configured to distribute media in a ring network. Distribution of the media on a communications link between a selected pair of adjacent nodes in the ring network is disabled in a manner maintaining communications between the selected pair of adjacent nodes other than for distribution of the media.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating the example embodiments of the invention.

DETAILED DESCRIPTION OF THE INVENTION

A description of example embodiments of the invention follows.

An embodiment of the present inventions includes a method or corresponding apparatus for distributing media in a ring topology network, optionally using Virtual Private Local Area Network (LAN) Service (VPLS). In this embodiment, the network may be designed such that there is a logical break in the ring, optionally in the center of the ring. The logical break (a) may be between (i) head-end ingress node on the ring network receiving media from a head-end node external from the ring network and (ii) an adjacent node in the ring network or (b) may be between two adjacent nodes downstream of the head-end ingress node. In the former embodiment, the head-end ingress node sends the media in one downstream direction. In the latter embodiment, the ingress head-end node sends data downstream in two directions on the ring network in a normal scenario. In a failure scenario, data may pass certain segments of the ring twice.

An embodiment of the present invention may leverage VPLS and Multi-Protocol LAN Service (MPLS) technologies. In utilizing VPLS, the embodiment may create a "replicate and forward" methodology for multicast traffic replication. This may be accomplished because the VPLS domain may appear as a large layer 2 switch when viewed from a prospective of any of the VPLS domain pseudowire (PSW) circuits. MPLS may be used as the underlying transport for the VPLS PSWs and may provide part of carrier-class redundancy.

Figure 1A:
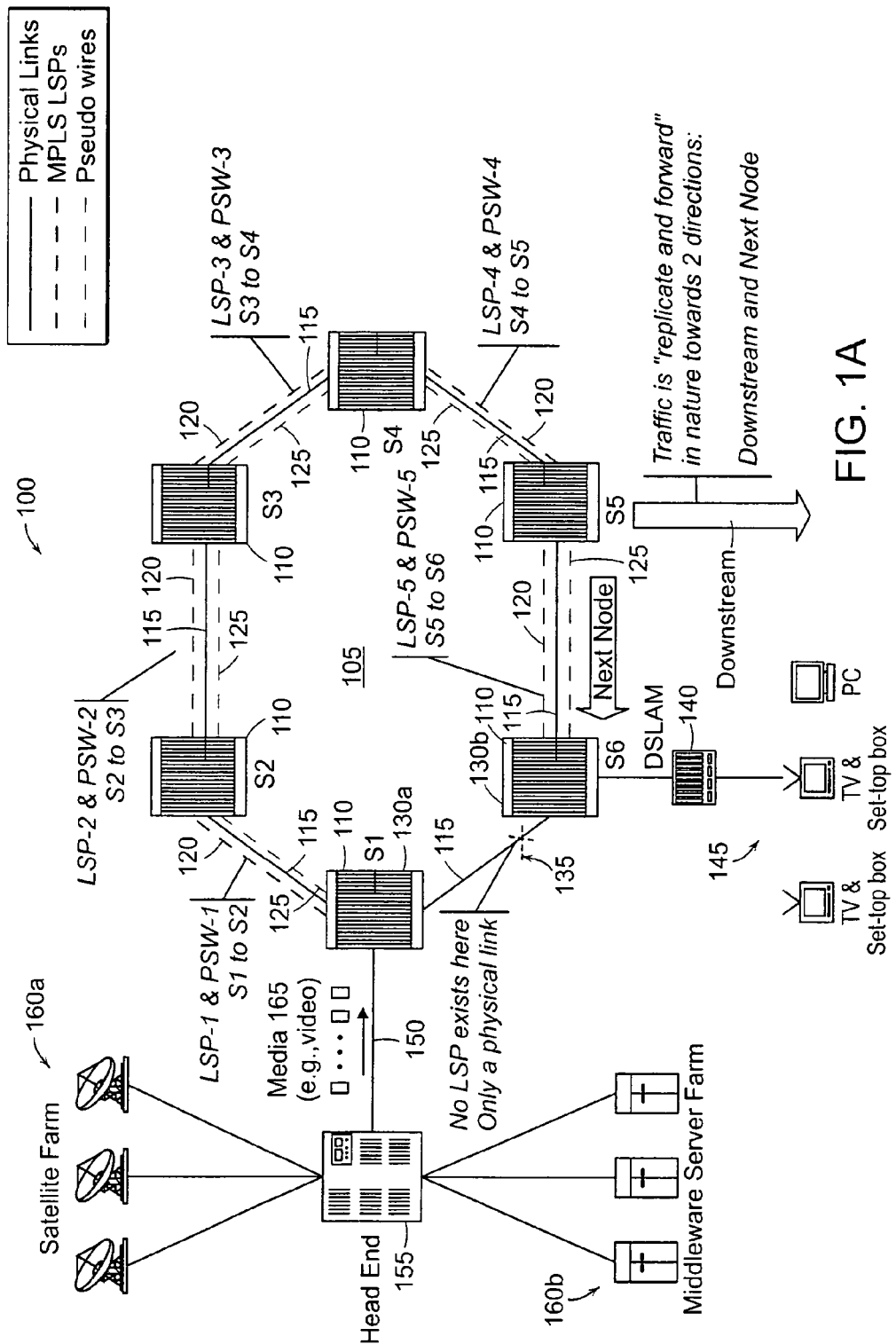
FIGS. 1A-1C are network diagrams illustrating an embodiment of the present invention.

FIG. 1A is a network diagram of a network 100 illustrating aspects of an embodiment of the present invention. A part of the network 100 is configured as a ring network 105 with six nodes 110, which may be aggregation nodes, connected via physical communications links 115. MPLS Label Switched Paths (LSPs) 120 may be configured in a manner traversing the communications links 115 and carrying pseudowires 125. Communications traffic, media traffic, or other forms of traffic, such as narrowband communications or data, ride on the MPLS LSPs 120 or pseudowires 125, as known in the art.

In the network 100 of FIG. 1A, a service provider may configure the multiple nodes 110 and communications links 115 to distribute media in the ring network 105. According to an embodiment of the present invention, the service provider may also disable distribution of the media on a communications link, such as a communications link 135 between a selected pair of adjacent nodes 130a and 130b in the ring network 105 in a manner maintaining communications between the selected pair of adjacent nodes 130a, 130b other than for distribution of the media.

The network 100 may also include a head-end (HE) node 155 that provides media (e.g., video content) 165 to the ring network 105 at node S1 (i.e., head-end ingress node) of the multiple nodes 110. The media 165 may be switched throughout the ring network nodes S2 through S6 at layer 2 via VPLS. At each node 110, a "replicate and forward" function may be employed for true multicast transmission by forwarding the traffic in two directions: (1) downstream for distribution to a Digital Subscriber Line Access Multiplexer (DSLAM) system 140, FTTx termination devices 145, Layer 2 switches, IP routers, Reconfigurable Optical Add/Drop Multiplexers (ROADMs), Cable Modem Head-ends, etc., and (2) downstream to the next node on the ring network 105.

The head-end node 155 may receive media from upstream sources, such as a satellite farm 160a or a middleware server farm 160b. Video or other media content can be distributed using any of multiple forms of distribution technologies, such as spanning tree, Resilient Packet Ring (RPR), token passing, Bi-directional Line Switched Ring (BLSR), Uni-directional Path Switch Ring (UPSR), layer 3 technologies, such as a multicast routing protocol (e.g., protocol independent multicast, sparse node (PIM-SM), which may or may or not be MPLS enabled), layer 2 technologies, such as VPLS, transparent bridging (without VPLS), Internet Group Management Protocol (IGMP) snooping, point-to-multi point protocol, or a layer 1.5 drop and continue mode protocol.

Continuing to refer to FIG. 1A, the ring network 105 has a communications link 115 that is configured as a logical break 135 with respect to distribution of the media 165. Thus, the ring network 105 can be considered a "horseshoe" topology, though the topology described below in reference to FIGS. 3A-3D more clearly illustrates the "horseshoe" topology. The logical break 135, across which distribution of the media is disabled, prevents a loop in the ring network 105. If there is a fault, a typical work-around is employed that is not dependent on the horseshoe topology. In some embodiments, the work-around includes enabling distribution of the media 165 via the communications link 175 previously configured with the logical break 135.

In the embodiment of FIG. 1A, the two nodes 130a and 130b on each side of the disabled link 135 are aware of the disabled link 135; other nodes may or may not be aware of the disabled link 135. Thus, the horseshoe topology may be pre-configured in a manual manner or via a Network Management System (NMS).

Benefits of the horseshoe topology for service providers include not having to add information to communications nor having to run a control protocol to break the loop (e.g., spanning tree (layer 2) or PIM (layer 3)). In one embodiment, MPLS may be employed in the ring network 105. VPLS and MPLS may be used for a layer 2 loading, forwarding, or replication of packets. VPLS allows media service (e.g., video streams) at guaranteed Quality of Service (QoS) dedicated bandwidth (BW) and may be used to interact with IGMP snooping.

Because VPLS is commonly used to deliver a Virtual Local Area Network (VLAN) type of service, it usually employs a full mesh of MPLS LSPs and VPLS PSWs between the sites of a particular VPLS domain. This configuration is derived from a need for all sites to know how to reach all of the other sites within their VPLS domain. However, the nature of IP multicast traffic is somewhat different. IP multicast does not require that each of the VPLS domain members knows how to reach all other members in the domain—it only knows how to reach its neighboring node. This change relaxes the need for full mesh topology, which leads to a decrease in the required number of LSPs/PSWs employed in the network, thereby simplifying network topology, implementation, and support. Then, the multicast traffic may be "replicated and forwarded" on a per node basis, and this may be responsible for ensuring that all relevant multicast traffic reaches all of the specified downstream nodes.

Figure 1B:
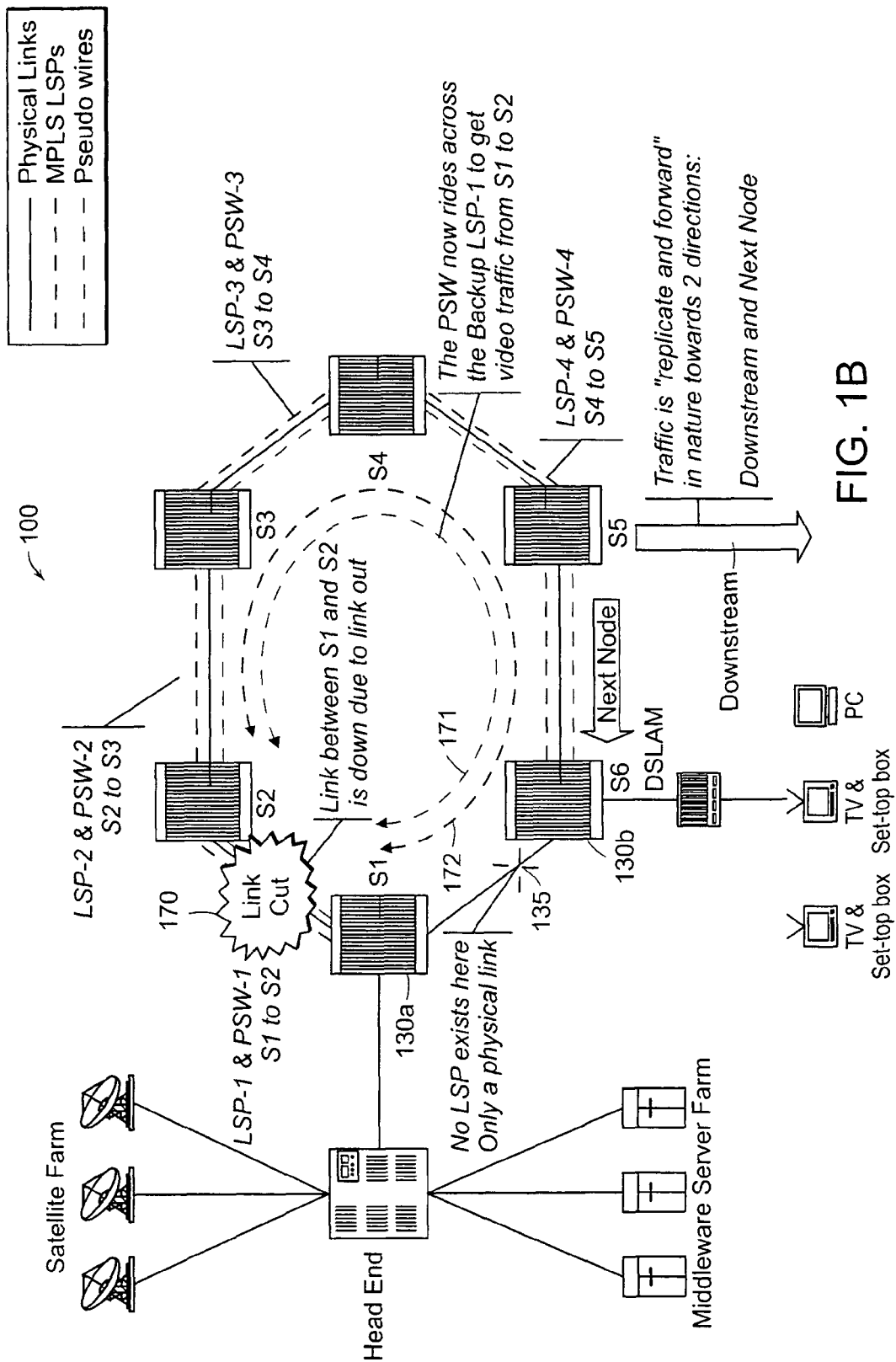

FIG. 1B illustrates how the network 100 can be self-healing and resilient. The same IP media content distribution network as FIG. 1A is presented in FIG. 1B; however, this network 100 has a link cut 170 between nodes S1 and S2. In an event a link cut 170 occurs, illustrated as a severed communications link between nodes S1 and S2, a PSW 171, which rides on a backup LSP 172, is employed to get the media traffic from node S1 to node S2.

When nodes S1 and S2 detect the link failure 170, they switch over to the pre-provisioned or signaled backup LSP 172, and an associated PSW 171 follows this LSP 172. Traffic then flows from node S1 in a counter-clockwise direction to node S2 via the other nodes (S5, S4, and S3) along the way, and service is restored within a short amount of time, such as 7 msec. MPLS Fast Re-Route (FRR) technology may be employed to ensure restoration of distribution of the media within a specified length of time.

Figure 1C:
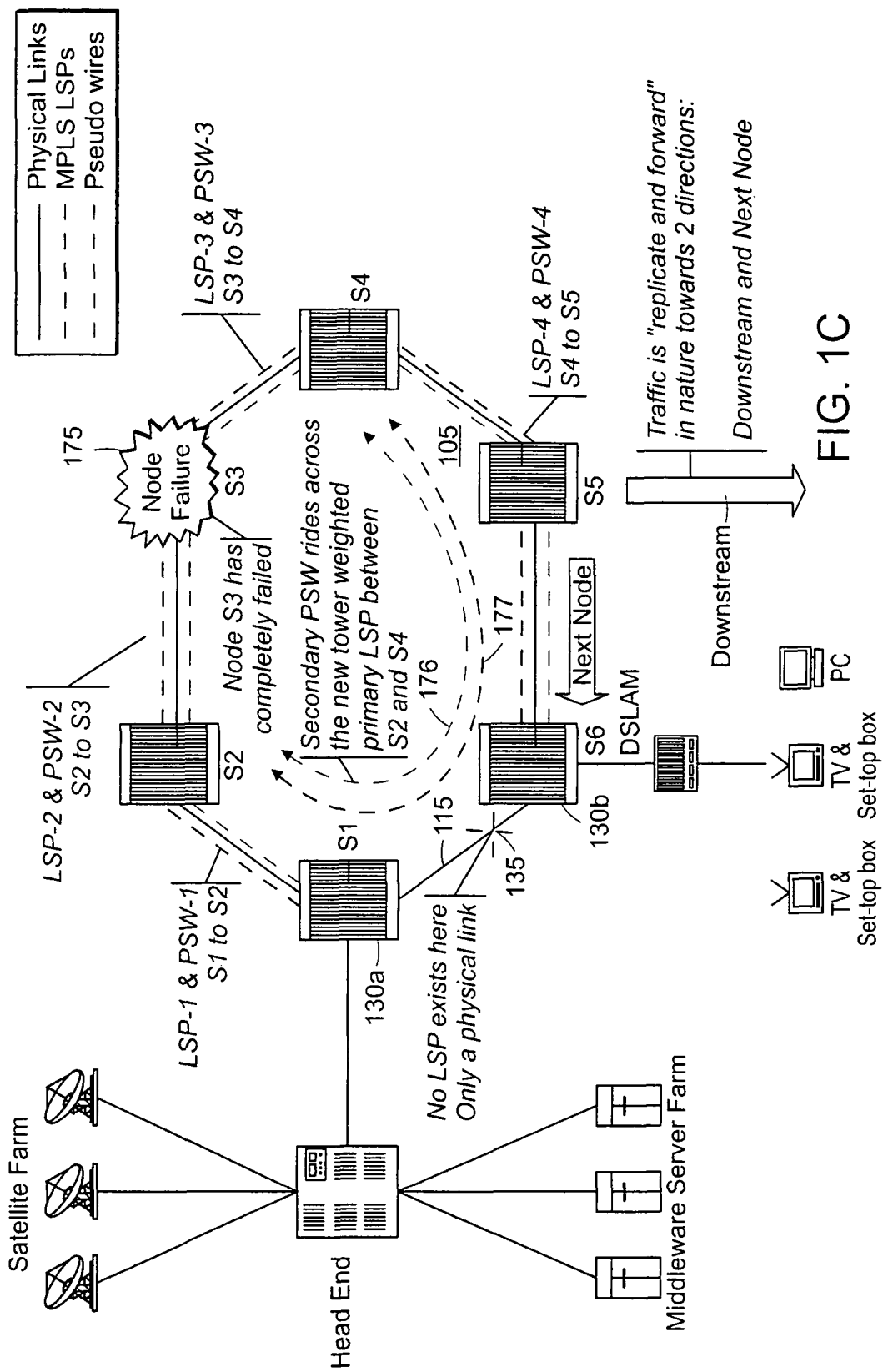

FIG. 1C illustrates a scenario in which there is a complete node failure 175. To address this worst case scenario, a second primary LSP 177 may be provisioned on each node in the ring network 105. This second primary LSP 177 is not a backup LSP, but actually a second primary LSP that provides a redundant connection in an event of a complete node failure 175. A secondary PSW 176 rides on the second primary LSP 177 between nodes S2 and S4. Because of a requirement for backup LSPs to have the same end nodes as their primary counterparts, this new LSP 177 is a primary, not a secondary, LSP. However, the new primary LSP 177 may have a lower weight when compared to the preferred primary LSP so that it is used in an event of a preferred primary and backup LSP complete failure—a condition that exists if a node fails, such as node S3.

It should be understood that, following the node failure 175 of node S3, the communications link 115 with the logical break 135 between the selected pair of adjacent nodes 130a, 130b is enabled to carry the media via the PSW 176 that rides across the lower weighted primary LSP 177 between nodes S2 and S4. Enabling the initially disabled communications link (i.e., communications link 115 with the logical break 135) may occur both in an event of a node failure 175 or, as illustrated in FIG. 1B, a link failure 170.

Figure 2A:
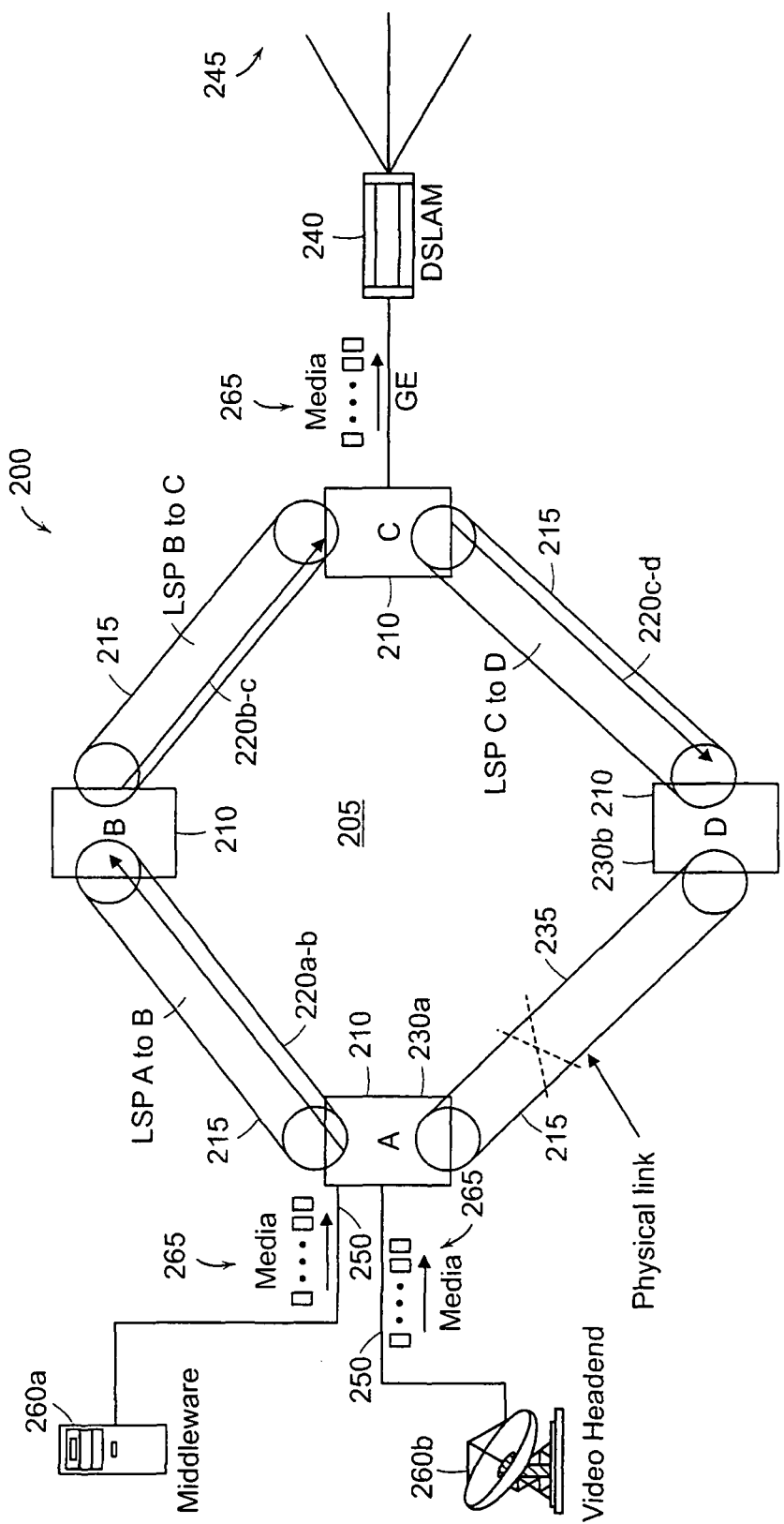
FIGS. 2A-2F are network diagrams illustrating a technique of configuring a network with an embodiment of the present invention.

FIGS. 2A-2F illustrate another embodiment of the present invention in which a configuration embodiment of a ring network is illustrated. Referring first to FIG. 2A, a network 200 with a ring network 205 employs network nodes 210, including nodes A, B, C, and D. Between the network nodes are physical links 215. On three of the four physical links 215 are LSPs 220a-b, 220b-c, and 220c-d. On the fourth of the four physical links 215, between nodes A and D, is a physical link 215 with a logical break 235 with respect to carrying media between nodes A and D, which are a selected pair of adjacent nodes 230a, 230b. Media 265 (e.g., video content) may be received from a middleware server farm 260a or a video head-end node 260b, or other media source (not shown). As illustrated, the media 265 may be dropped from node C to a DSLAM 240, and further distributed to end user terminal devices 245 (not shown).

In the embodiment of FIG. 2A, it is assumed that node A is in a Central Office (CO) and has no subscribers receiving the media 265 from it. Nodes B, C and D may have IP DSLAM(s) connected to them. It should be understood that the physical ring of the ring network 205 is closed, but the LSP ring is not closed, i.e., there is no LSP from node D to node A in this example network configuration and no media traffic flows over this link, except in cases of failure(s) in the network.

Figure 2B:
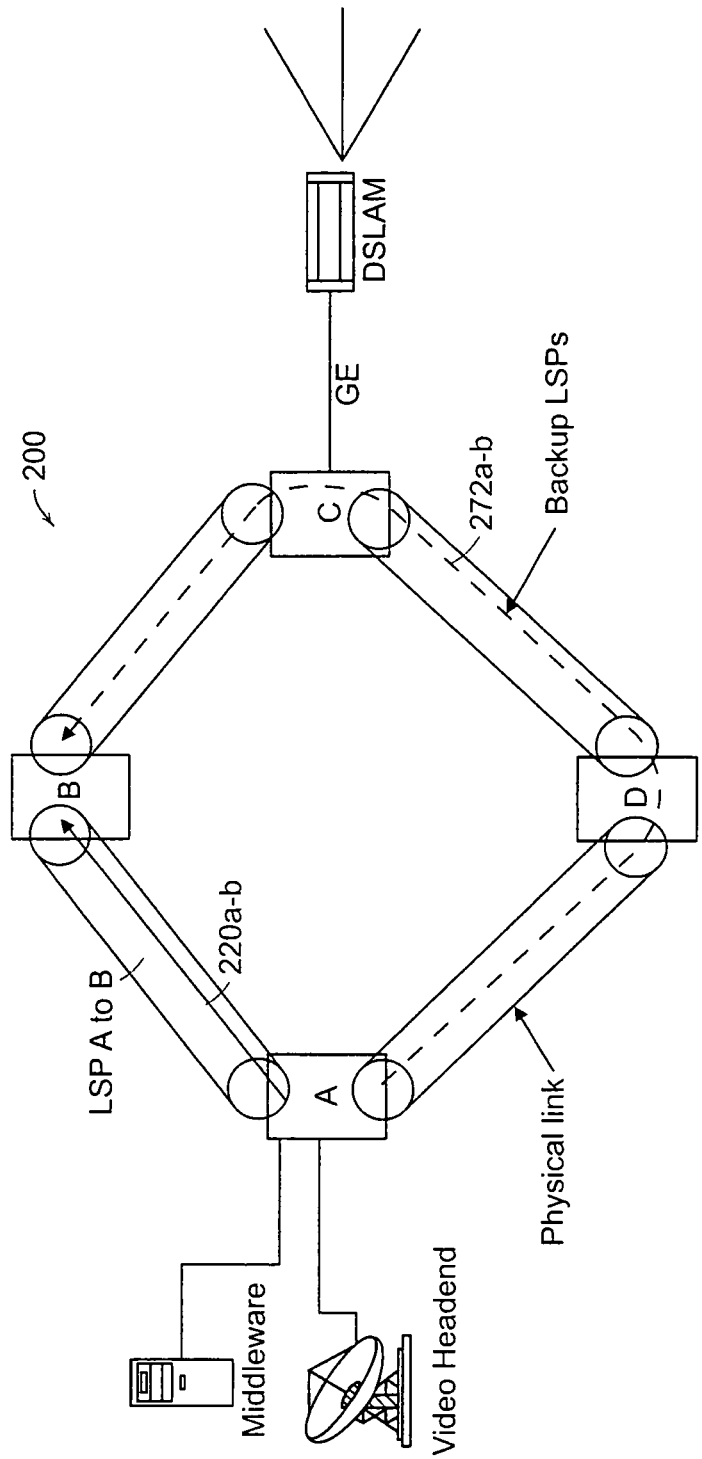

FIG. 2B illustrates a first configuration step in which an LSP 220a-b is configured from nodes A to B, optionally with a Fast ReRoute (FRR) facility. Primary LSPs are configured on a per hop basis. In this case, an LSP is created to carry communications between node A and node B. The same steps are created for nodes B to C and nodes C to D. In one embodiment, on configuring each primary LSP, a MPLS fast reroute (FRR) facility is employed. This automatically creates a backup LSP 272a-b in the opposite direction of the LSP 220a-b it is backing-up. In the example of FIG. 2B, this backup LSP 272a-b is automatically provisioned from node A to node D to node C on its way to node B. Note that the backup LSP 272a-b is not terminated in a hop-per-hop manner at intermediate nodes A, D, and C, but is transparently passed through them. The backup LSP 272a-b is terminated at node B, which is its protect node, as understood in the art. It is also understood in the art that there is no traffic flow over the backup LSP 272a-b when it is acting in a standby mode.

Figure 2C:
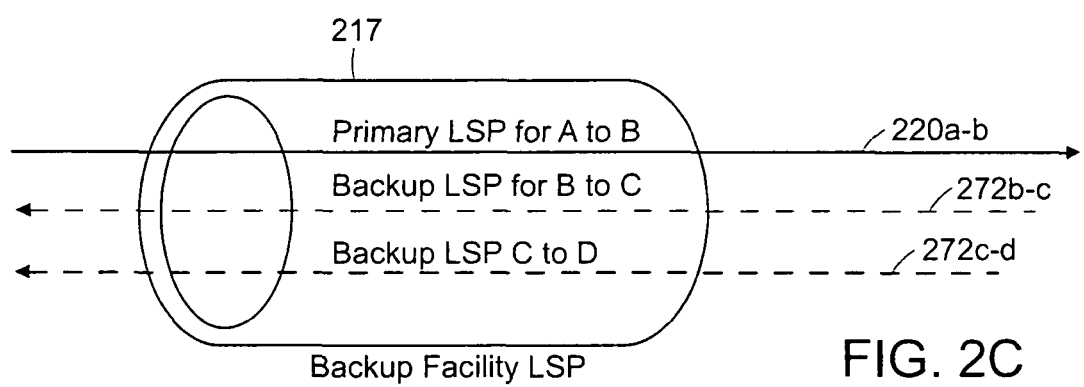

FIG. 2C is a diagram illustrating a backup facility LSP 217 between nodes A and B. MPLS may be employed to facilitate FRR backup LSPs 272b-c and 272c-d, which are backing-up a primary LSP 220a-b on a link segment between two nodes (e.g., node A and node B). The backup LSPs 272b-c and 272c-d may share the same facility backup LSP 217 or use different facility back-up LSPs. Sharing one facility backup LSP 217 may consume less control bandwidth since one large facility LSP can be created.

Figure 2D:
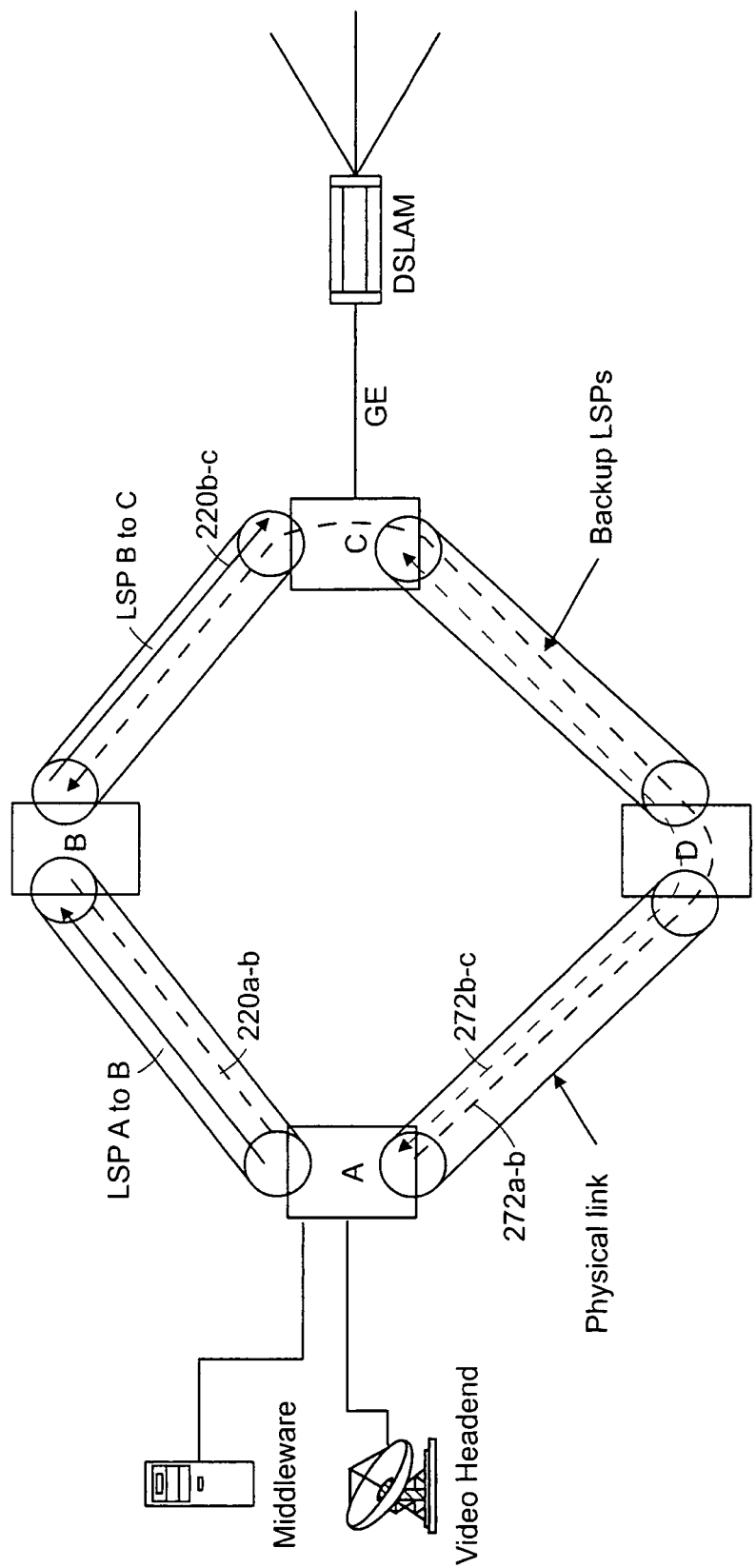

FIG. 2D is a network diagram at a next point in configuring an embodiment of the present invention. A backup LSP 220b-c is created from node B to node C, optionally with a Fast Re-Route (FRR) facility. In one embodiment, a backup LSP 272a-b is configured when the primary LSP 220a-b is configured between nodes A and B.

Figure 2E:
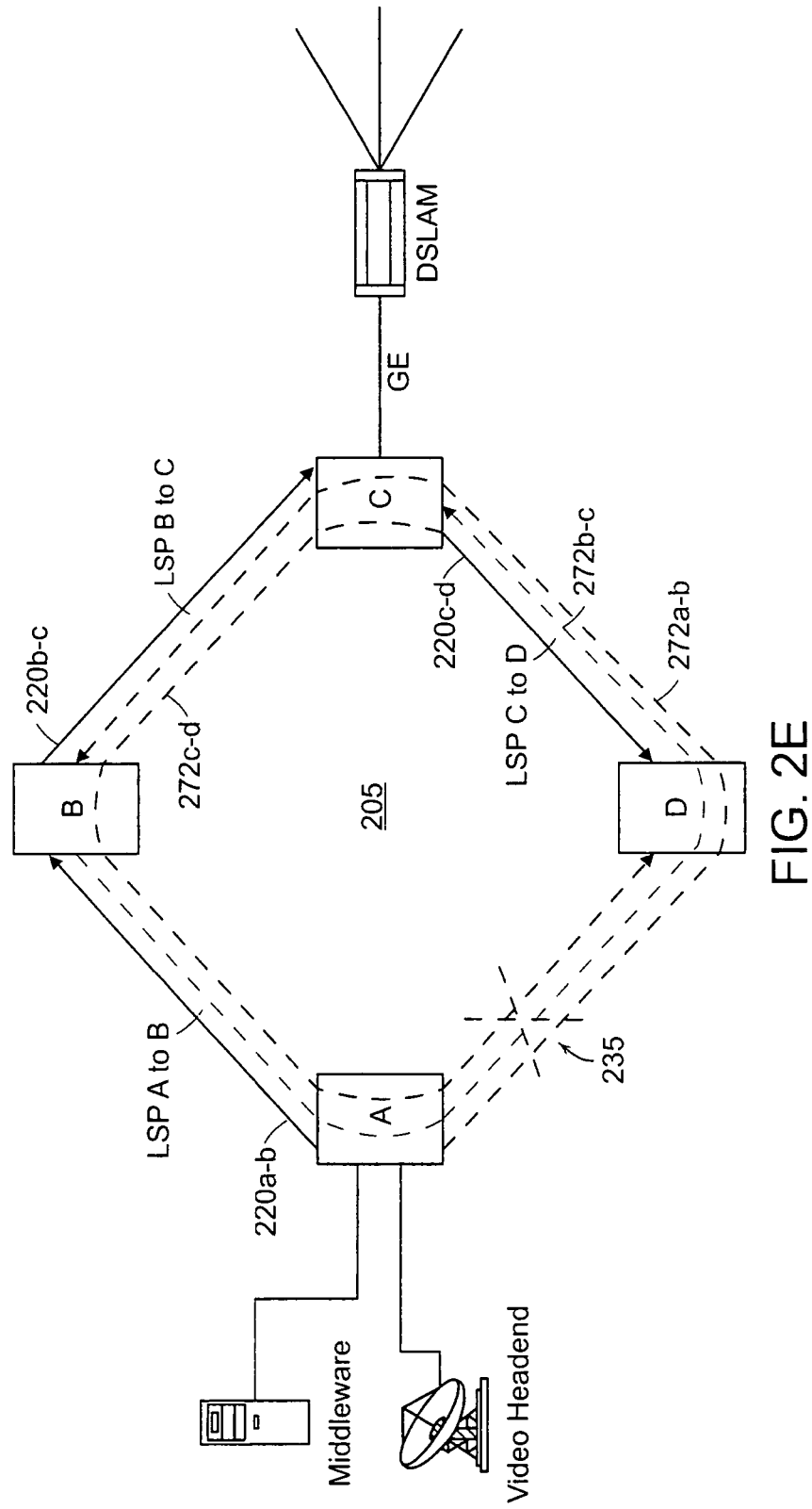

FIG. 2E is a network diagram illustrating LSPs 220a-b, 220b-c, and 220c-d configured on the four node network across physical links (not shown) other than the communications link with the logical break 235 disabled from distributing media absent a node or link failure in the ring network 205. The backup LSPs 272a-b, 272b-c, and 272c-d are optionally configured on the ring network 205. Having the backup LSPs configured allows for rapid recovery from a failure on a different communications link failure or a network node failure.

Figure 2F:
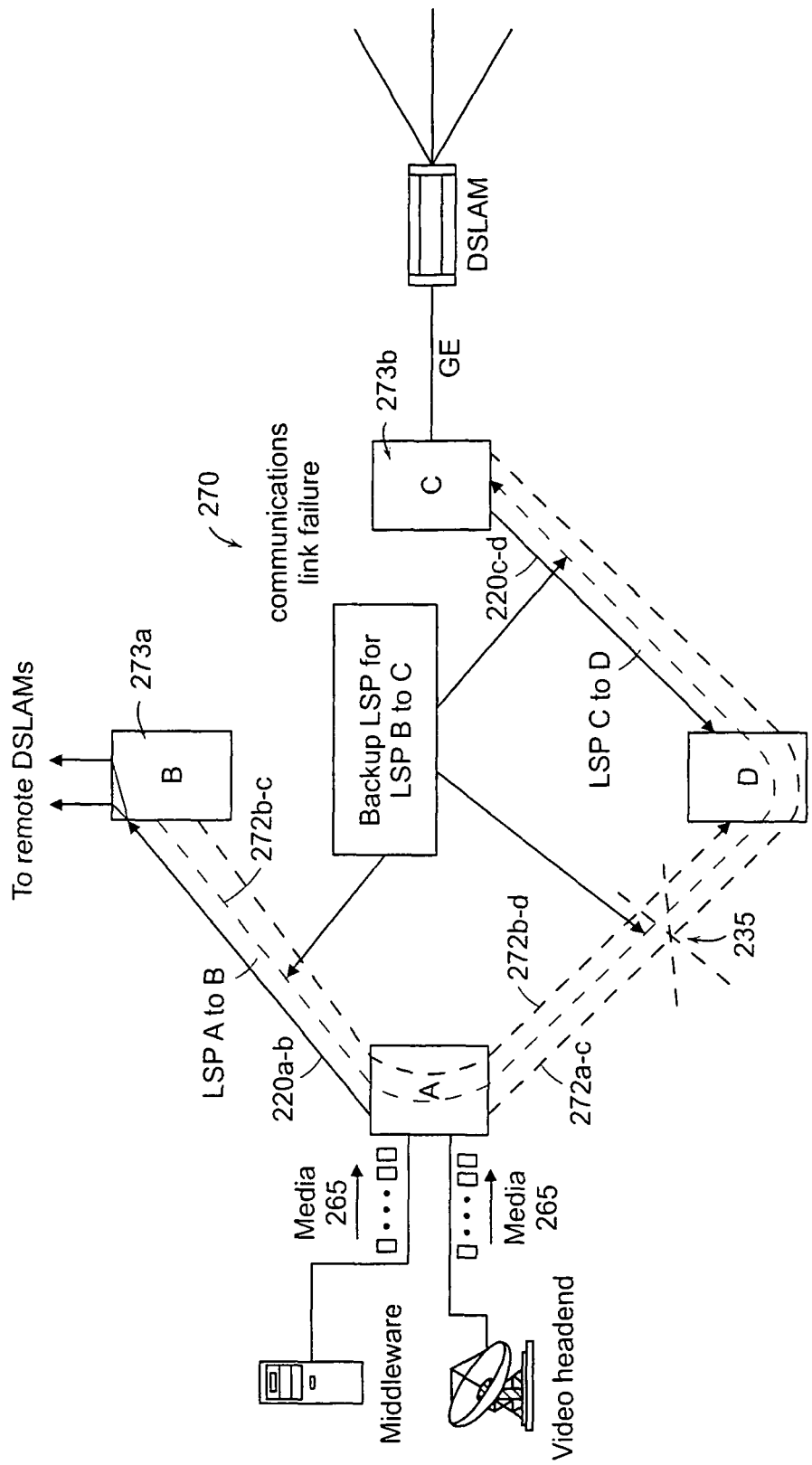

FIG. 2F illustrates a scenario in which there is a communications link failure 270. The backup LSP 272b-c for node C flows from node B to A, then from node D to node C, recovering media distribution in less than 50 msec (in some embodiments) following the communications link failure 270. Nodes B and C have drop and loopback configurations 273a, 273b, respectively, to distribute the media 265 to its destination(s). For example, node C may replicate video traffic onto a primary LSP 220c-d from node C to node D for transporting the video traffic from node C to node D.

In reference to FIGS. 1A-1C and 2A-2F, it is described above how a network can provide an extremely resilient architectural solution for delivery of IP media services, such as video. However, the previous topologies suffer from one weakness—a single point of failure at the head-end ingress node S1. This weakness can be addressed by using a different embodiment of the "horseshoe" topology.

As described above in reference to FIGS. 1A-1C and 2A-2F, a logical break (i.e., logical breaks 135 and 235, respectively) in traffic flow may be installed between the last ring node and the ingress (i.e., head-end) ring node because, if this break does not exist, multicast traffic flows backup on itself throughout the ring network. In the topology examples of FIGS. 1A-1C and 2A-2F, this logical break 135, 235, respectively, is installed between the ingress node S1 and the last node in the ring S6; however, if the logical break is moved to be more toward the center of the ring, it becomes possible to avoid having a single point of failure at the head-end ingress node.

Figure 3A:
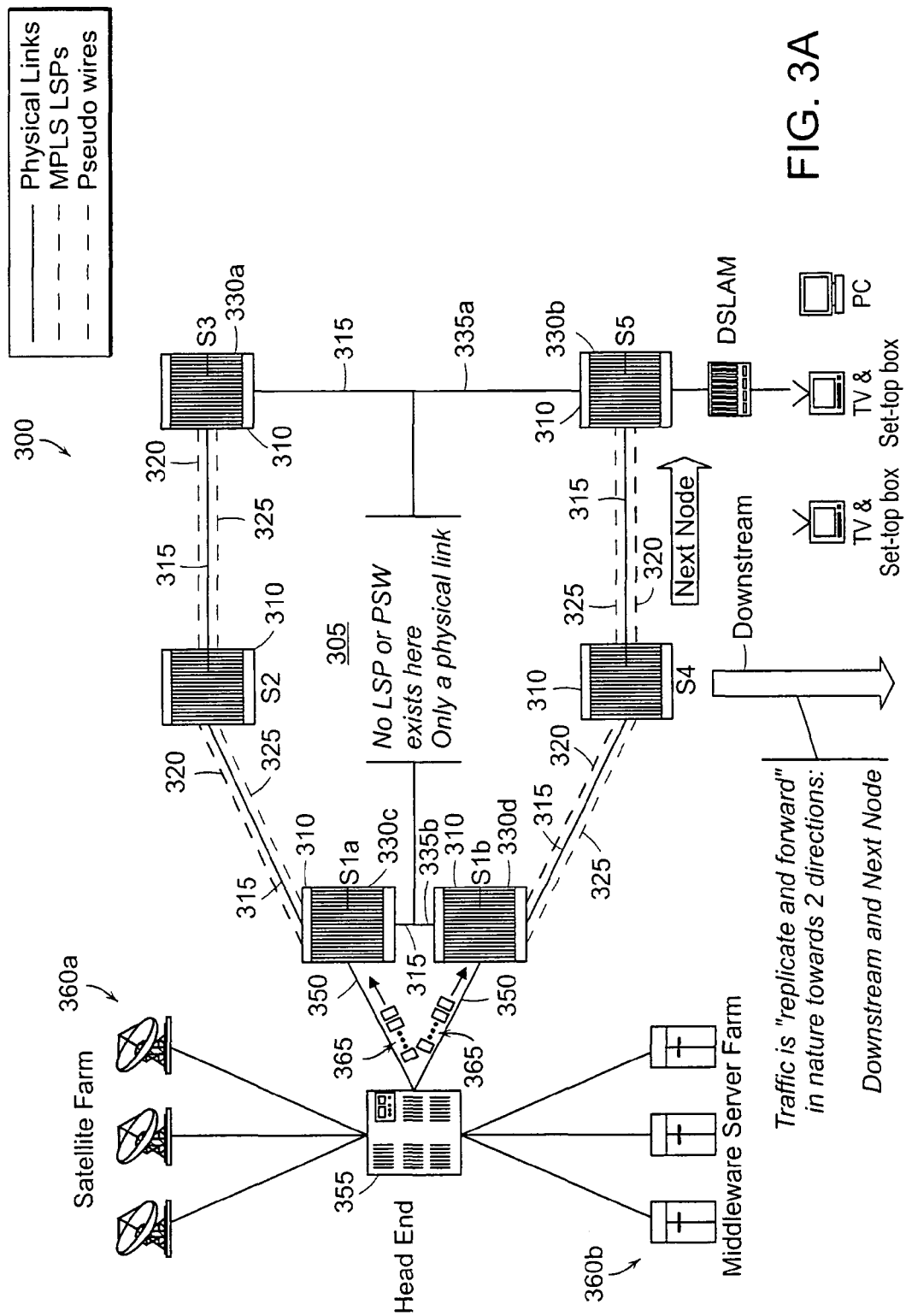
FIGS. 3A-3D are network diagrams illustrating another embodiment of the present invention.

FIG. 3A is a network diagram of a network 300 that illustrates another embodiment of the "horseshoe" topology. In the example network 300, there are two logical breaks 335a, 335b in the ring network 305 instead of just one—one logical break 335a between a selected pair of adjacent nodes 330a and another logical break 335b between the head-end ingress nodes 330c and 330d, respectively. Again, these logical breaks 335a, 335b are used to constrain traffic to a particular side of the ring network 305 during normal operations.

The network 300 includes similar network nodes and communications links as presented in reference to FIG. 1A. For example, a satellite farm 360a and middleware server farm 360b provide media 365 to the head-end node 355. In the normal operational state, traffic flows from the head-end node 355 into both of the head-end ingress nodes S1a and S1b 330c, 330d, respectively. Each ingress node then forwards traffic on to its particular half of the ring; that is, node S1a feeds nodes S2 and S3 and node S1b feeds nodes S4 and S5. The physical links 315 with logical breaks 335a, 335b between nodes S3/S5 and S1a/S1b, respectively, may be used for distributing the media 365 only during network faults in one embodiment. Similar physical links 315, MPLS LSPs 320, and pseudowires 325 are employed in the network 300 of FIG. 3A as were employed in the network of FIG. 1A, and the MPLS LSPs 320 and pseudowires 325 are used in a corresponding manner.

Figure 3B:
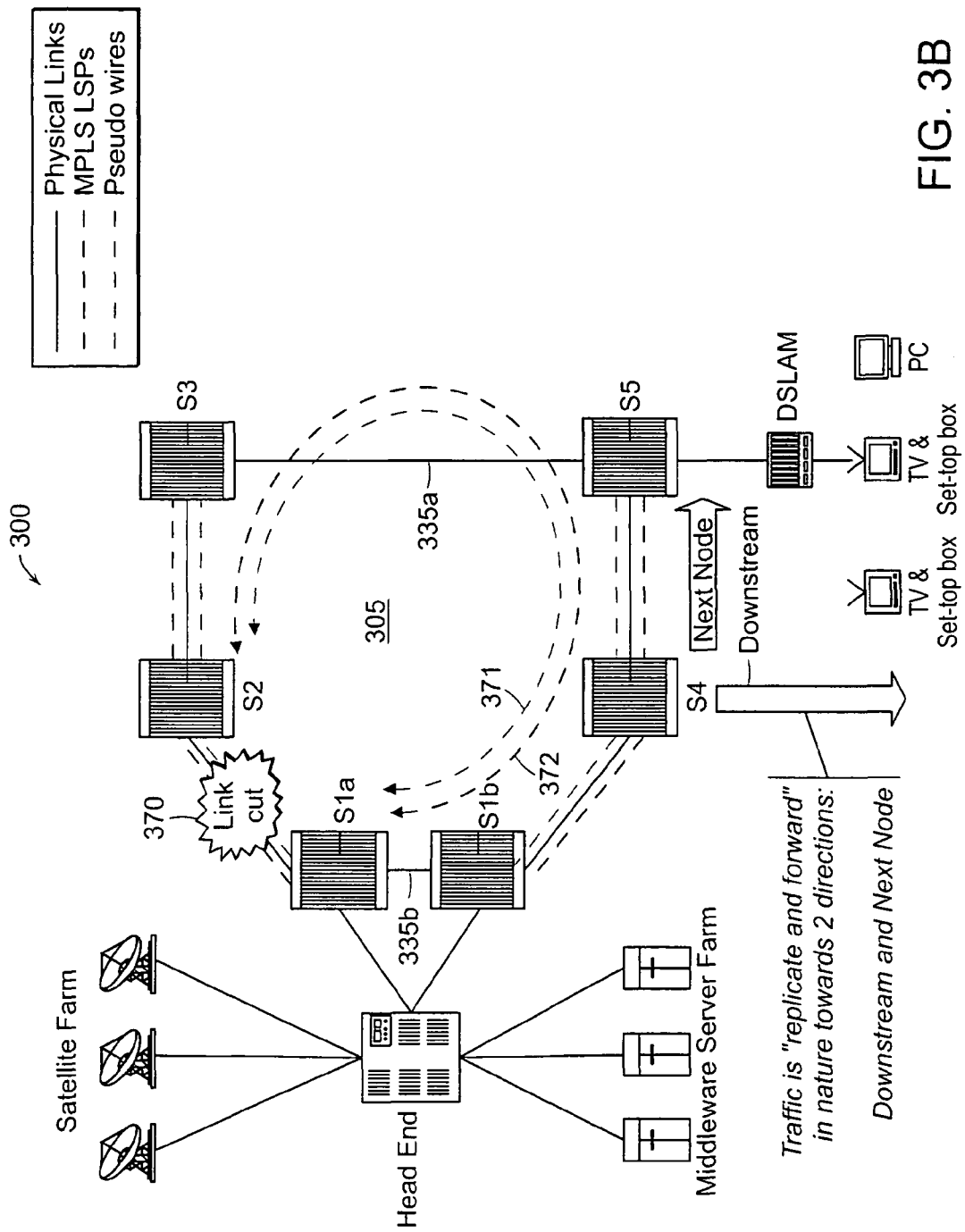

FIG. 3B is a network diagram in which the network 300 has a link cut (or failure) 370. Recovery after a link failure with this "horseshoe" topology is similar to what was presented in reference to FIG. 1B. Specifically, in one embodiment, upon detection of the link cut 370, the nodes S1a and S2 neighboring the link cut 370 begin forwarding traffic across a backup LSP 372 and accompanying pseudowire (PSW) 371. Within 7 msec, for example, node S1a begins forwarding traffic across the backup LSP 372 to node S2. When in the recovery configuration, the traffic flows in an opposite direction as normal traffic flow absent the link cut 375a. Node S2 then continues traffic flow to node S3.

Figure 3C:
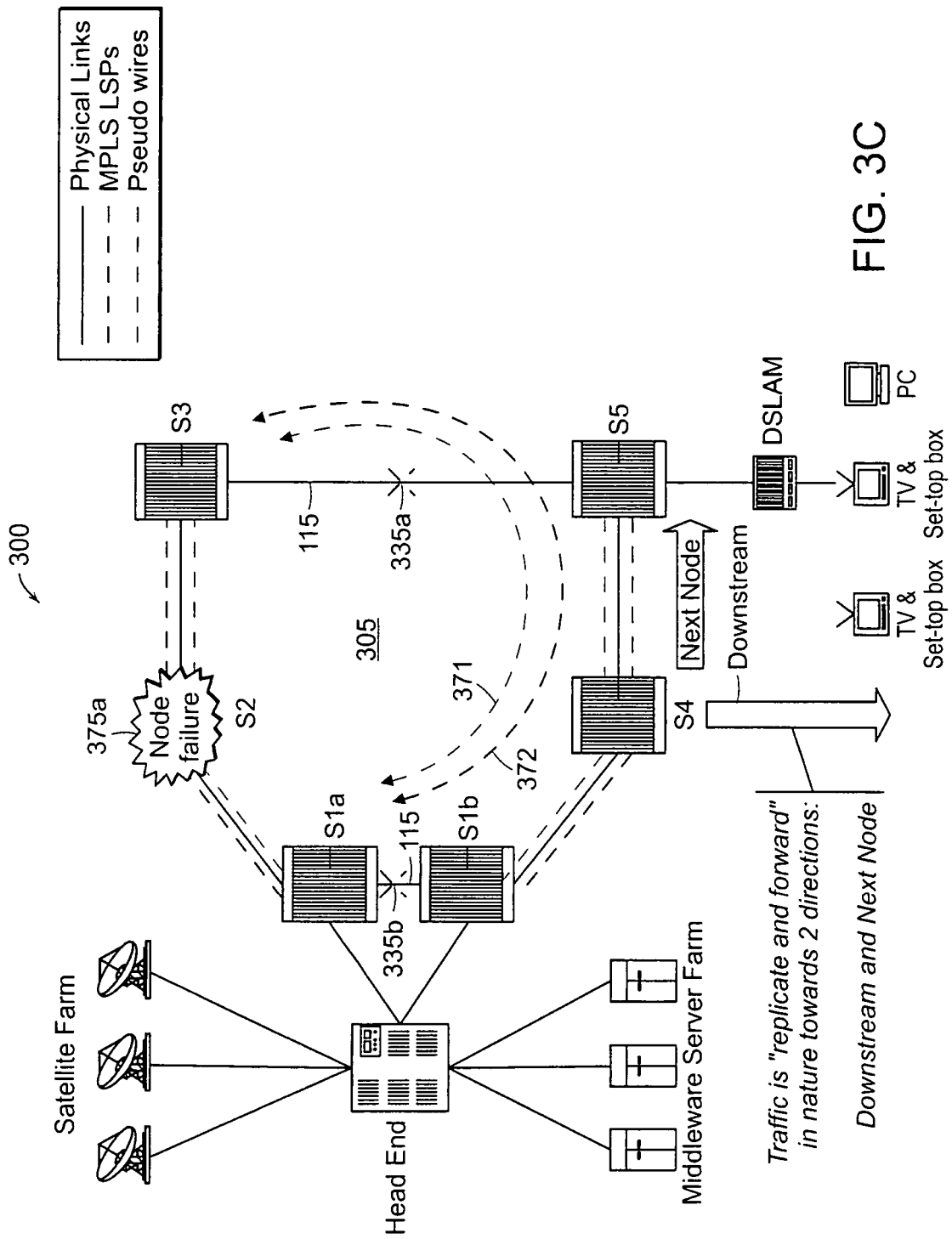

FIG. 3C is a network diagram of the network 300 in which a node failure 375a occurs. Recovery after a complete node failure with this embodiment of the "horseshoe" topology is similar to what was presented earlier in reference to FIG. 1C. Upon detection of link failures resulting from the failed node, the neighboring nodes begin forwarding traffic across a new preferred connection of a secondary PSW. The new PSW is riding on top of a new primary LSP, as understood in the art. For example, in the network diagram of FIG. 3C, node S2 has completely failed 375a. This has resulted in failure of all LSPs and PSWs involving node S2. When nodes S1a and S3 detect the failure, a pre-provisioned secondary PSW 371 between nodes S1a and S3 becomes the preferred traffic path, and service is restored. After the node failure 375a is corrected, the network configuration may be returned to the "horseshoe" topology with disabled communications links 315 having respective logical breaks 335a, 335b.

Figure 3D:
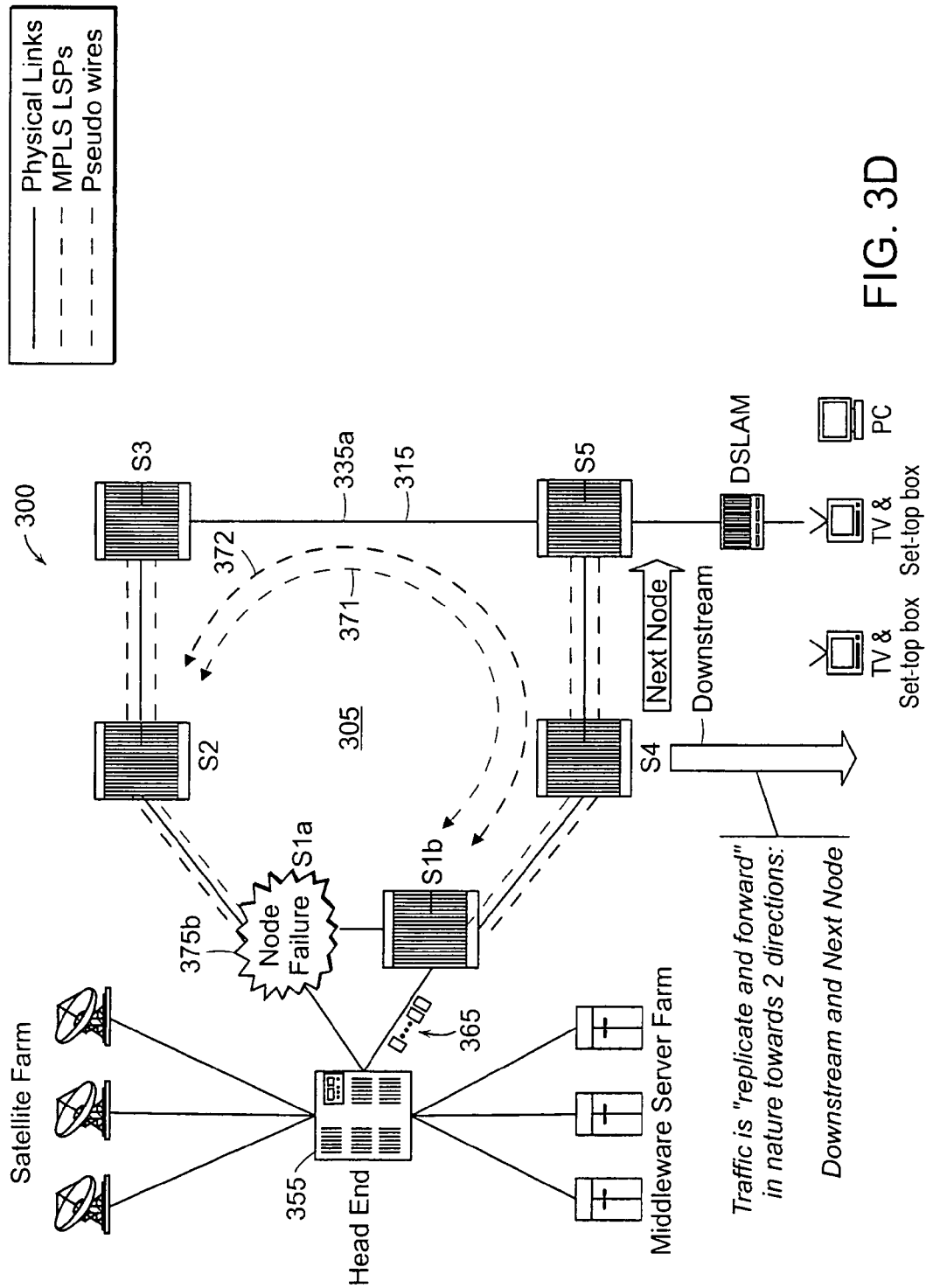

FIG. 3D is a network diagram of the network 300 in which one of the head-end ingress nodes, node S1a, receiving communications from a head-end node 355 experiences a complete failure 375b. Recovery after a complete head-end node failure 375b is very similar, in some embodiments, as to what occurs in the node failure of FIG. 3C. The difference is that, during recovery, the remaining operational ingress node, node S1b, serves the entire ring topology, not just half as in normal operation.

In the network diagram of FIG. 3D, node S1a has completely failed 375b. This has resulted in the failure of all LSPs and PSWs involving node S1a. In addition, all customers served by the top half of the ring (i.e., nodes S2 and S3) are in jeopardy of experiencing a loss of communications containing media 365 or other content. When nodes S1b and S3 detect the failure of node S1a, a pre-provisioned secondary PSW 371 between nodes S1b and S2 becomes a preferred traffic path for the remaining active nodes on the top half of the ring (i.e., nodes S2 and S3) to receive communications with the media 365 or other content. In the recovery state, traffic flows from the head-end node 355 into node S1b, across the secondary PSW 371 to node S2 via a communications link 315 (previously configured with a logical break 335a) between network nodes S5 and S3, and then downstream on the top half of the ring (i.e., from node S3 to node S2). Traffic on the PSW 371 is only forwarded by the intermediate nodes (S4, S5, S3) and not sent to locally attached DSLAMs on these intermediate nodes. Once node S2 receives the media traffic over the secondary PSW 371, it then continues sending the traffic downstream to node S3. Note that traffic flowing on the bottom half of the ring (i.e., nodes S1b, S4, and S5) remains unchanged during the recovery process in this embodiment.

Figure 4A:
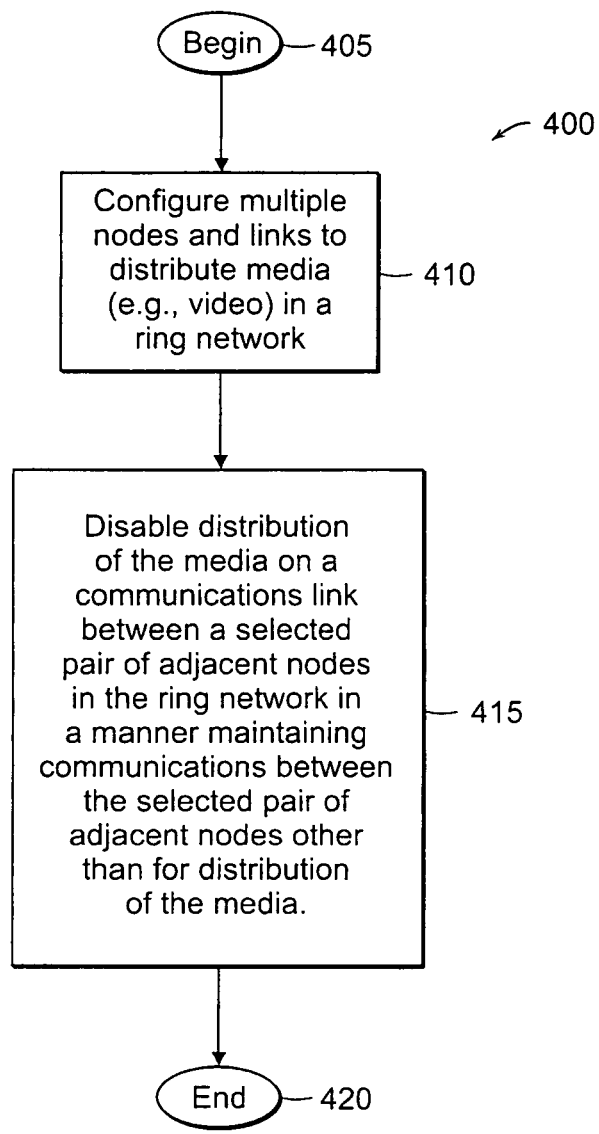
FIGS. 4A-4C are flow diagrams illustrating embodiments of the present invention.

FIG. 4A is a flow diagram of a process 400 illustrating an embodiment of the present invention. The process 400 begins (405) and configures multiple nodes and links to distribute media (e.g., video) in a ring network. Configuring the multiple nodes may be done by a service provider in a manual manner or using a Network Management System (NMS). Other typical ways of configuring multiple nodes and links to distribute media in a ring network may also be employed. MPLS VPLS techniques may be used to configure the nodes and links. After configuring the multiple nodes and links, the process 400 may disable distribution of the media on a communications link between a selected pair of adjacent nodes in the ring network in a manner maintaining communications between the selected pair of adjacent nodes other than for distribution of the media (415). By disabling distribution of the media on a communications link, the ring network is changed to be a "horseshoe" topology with respect to distribution of the media. The process 400 ends (420) thereafter and is set to adapt to a communications link failure or node failure in a manner as described above in reference to FIGS. 1A-1C, 2A-2F, and 3A-3D.

Figure 4B:
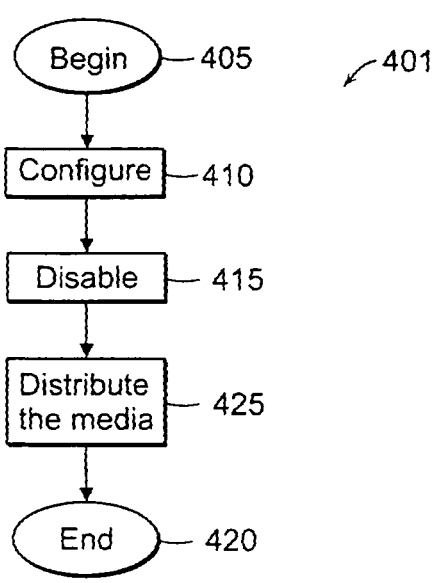

FIG. 4B is a flow diagram of a process 401 that includes the configuring (410) and disabling (415), as described above in reference to FIG. 4A, and also includes distributing the media (425) during an operational state of the network. Thus, FIG. 4A may relate to an example in which a manufacturer or distributor configures the network to operate according to an embodiment of the present invention, and the example embodiment of FIG. 4B may relate to a service provider (or other party) in which the service provider configures a network and distributes the media on the network, optionally with contribution from a media content provider, such as a video distributor.

Figures 2, 4C:
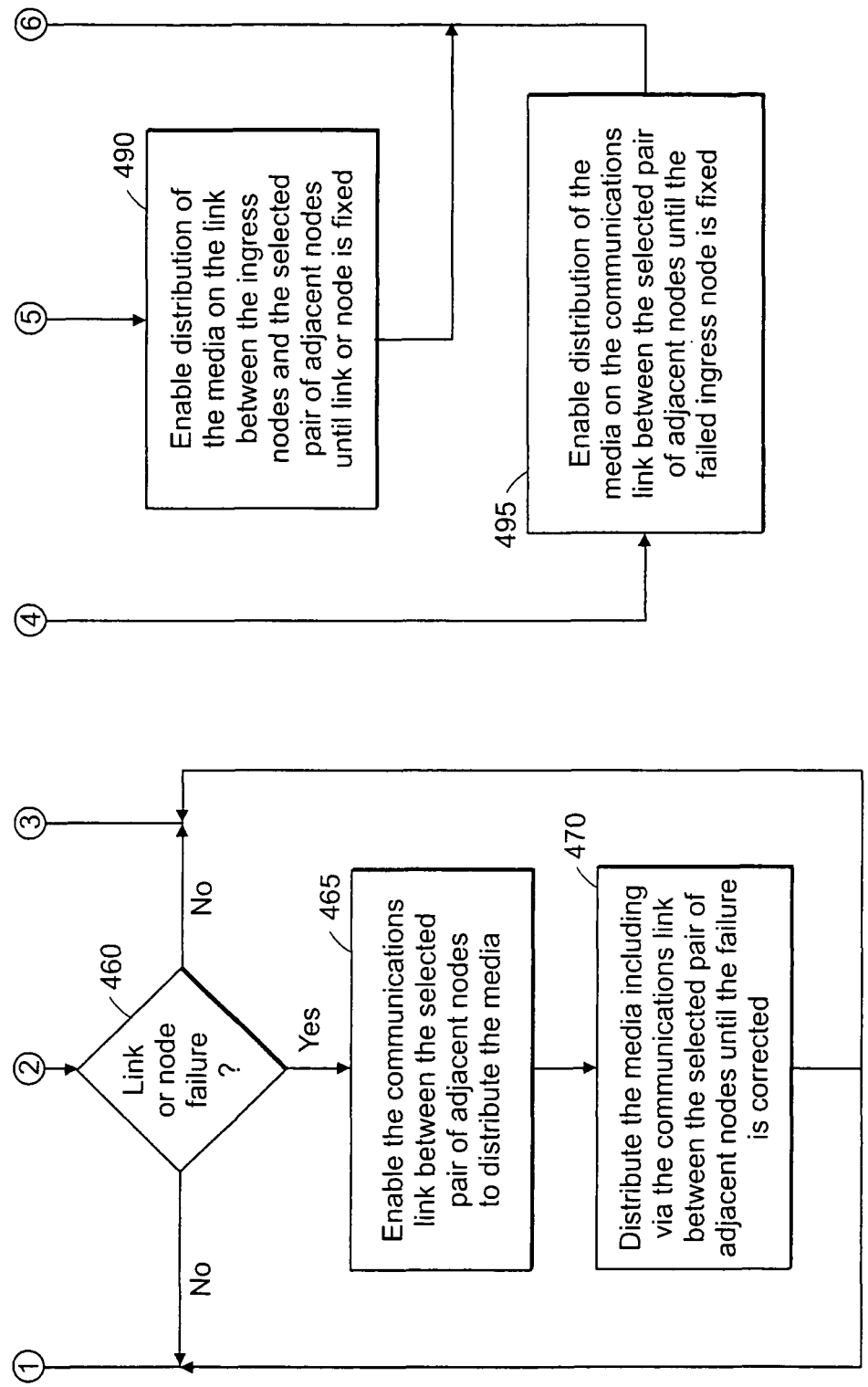

FIG. 4C is a flow diagram of a process 402 that may be used in the network embodiments of FIGS. 1A-1C or FIGS. 3A-3D. The process 402 begins (430) and adds media to a head-end ingress node on a ring topology (435) receiving media from a head-end node, as described in reference to FIGS. 1A-1C and 3A-3D. A determination may be made as to whether the head-end ingress node is a single node or a pair of nodes (440). The process 402 continues in two different, but similar, paths depending on whether the head-end ingress node is a single node or a pair of nodes, as described above in reference to FIGS. 1A-1C or FIGS. 3A-3D.

If the ingress node is a single node, the process 402 determines whether the ingress node is one of the nodes in the pair of selected adjacent nodes between which the communications link is disabled (445). If the ingress node is one of the nodes in the selected pair of adjacent nodes, the media is distributed in one direction on the ring topology (450). If the ingress node is not one of the nodes in the selected pair of adjacent nodes (445), the media is distributed in two directions on the ring topology (455). Either way, the process 405 continually or continuously determines whether there is a link or node failure (460). If there is no failure (460), the process 402 continues to distribute the media downstream in one or two directions (450, 455) on the ring topology. If there is a link or node failure, the communications link between the selected pair of adjacent nodes is enabled to distribute the media (465). After the communications link is enabled, the media is distributed via the communications link between the selected pair of adjacent nodes until the failure is corrected (470). In some embodiments, a PSW riding on an LSP, which traverses the enabled communications link and other communications links, is employed to distribute the media.

In an event the failure is corrected, it should be understood that the communications link between the selected pair of adjacent nodes may again be disabled to re-establish the "horseshoe" configuration as described above in reference to FIGS. 1A and 3A.

If the head-end ingress node connected to a head-end node is a pair of nodes (440), distribution of the media on a communications link between the pair of ingress nodes is disabled (475). Media is thereafter distributed (480), and continual or continuous checking as to whether there is a link or node failure (485) ensues. If there is no failure, distribution of the media (480) continues. If there is a link or node failure, then, if the failure node is a node in the pair of head-end ingress nodes, the distribution of the media on the communications link between the selected pair of adjacent nodes is enabled until the failed ingress node is fixed (i.e., in a working state) (495). If there is a link failure or a node failure that is not one of the pair of ingress nodes (485), distribution of the media on the communications link between the ingress nodes and the selected pair of adjacent nodes is enabled until the link or node is fixed (490). Thereafter, distribution of the media (480) continues in the failure recovery configuration until the failed node or communications link is fixed. Once the node or communications link is fixed, the network configuration can return to the initial state of a "horseshoe" configuration.

Figure 5A:
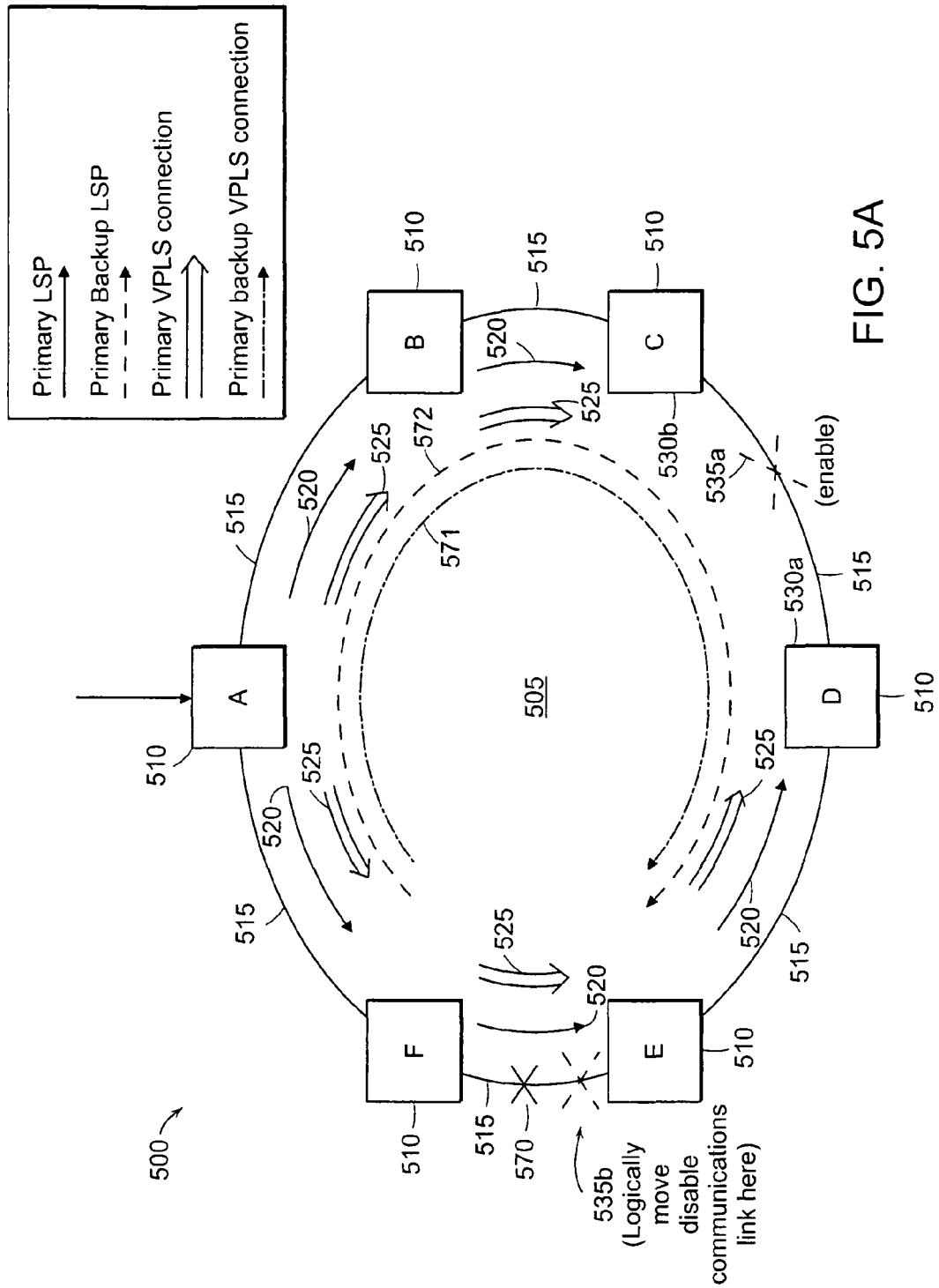
FIGS. 5A-5B are network diagrams illustrating an example embodiment of the present invention.

FIG. 5A is a network diagram illustrating an aspect of an example embodiment of the invention. The network diagram includes a network 500, which includes a ring network 505 with multiple nodes 510 interconnected via communications links 515. In the ring network 505, there are primary LSPs 520 traversing the communications links 515 and primary VPLS connections 525 riding on the primary LSPs 520. A logical break 535a is initially configured between a selected pair of adjacent nodes 530a, 530b, thus creating the "horseshoe" topology in the ring network.

In an event of a link failure (e.g., link cut) 570, an exemplary embodiment of the invention engages a primary backup LSP 572 and primary backup VPLS connection 571 to carry media or network communications between nodes F and E. To do so, the initially configured logical break 535a is enabled, and a logical break 535b is "logically moved" to the communications link 515 where the physical link failure 570 occurs. It should be understood that computer memory, such as a data table or memory register, may change states or not change states, depending on the implementation, to reorganize the "horseshoe" topology from (i) having a disabled communications link 515 between the selected pair of adjacent nodes 530a, 530b to (ii) having a disabled communications link 515 where the link failure 570 occurs, such as between adjacent nodes E and F. After the link failure 570 is repaired, the logical break 535a can be configured again between the selected pair of adjacent nodes 530a, 530b.

Figure 5B:
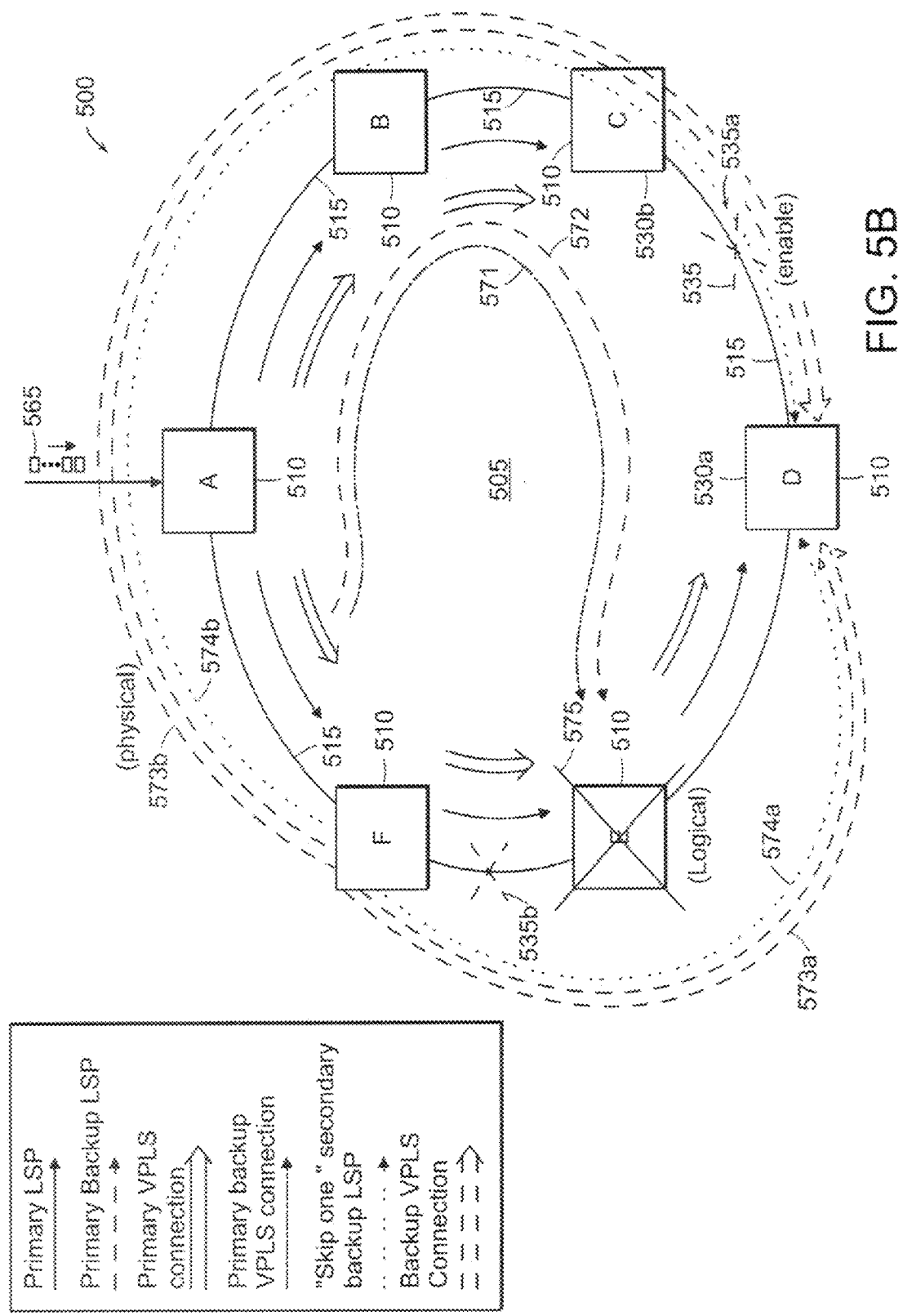

FIG. 5B is a network diagram of the network 500 illustrating another aspect of the example embodiment of the invention. In an event of a node failure 575, the example embodiment of the invention may enable the initially configured logical break 535a and logically assert a logical break 535b upstream or downstream of the node failure 575.

In this example embodiment, a secondary backup LSP 574a (logical), 574b (physical) may be employed to allow communications transporting media 565 to flow to node D, which includes flowing the media 565 across the initially disabled communications link 515 between the selected pair of adjacent nodes 530a, 530b. A backup VPLS connection 573a (logical), 573b (physical) rides on the secondary backup LSP 574a, 574b, respectively. The secondary backup LSP 574a (logical) may be referred to as a "skip one" secondary backup LSP 574a (logical) because it "skips" (logically) over the node failure 575 in the downstream direction. If two nodes downstream of a head-end ingress node, node A, fail, the example embodiment may use a "skip two" secondary backup LSP (not shown) in the downstream direction. Because communications cannot actually pass through the failed node 575, the "skip one" secondary backup LSP 574b (physical) traverses the physical links 515 of the ring network 505, via the nodes 510 from node F to node D, including across the re-enabled communications link 515 between the selected pair of adjacent nodes 530a, 530b.

As illustrated in FIGS. 5A and 5B, distribution of media 565 can be initially disabled on a communications link 515 to form a "horseshoe" topology in a ring network 505. Primary communications paths 520 to traverse the communications links 515, other than between the selected pair of adjacent nodes 530a, 530b, can be configured, and primary connections 525 to distribute the media 565 to each of the nodes 510 on the communications paths 520, including to the selected pair of adjacent nodes 530a, 530b, can also be configured. First backup communications paths 572 and 571 that use the primary connections 525 between adjacent nodes 510, other than between the selected pair of adjacent nodes 530a, 530b, can be configured. Second backup communications paths 574a (logical), 574b (physical) and secondary connections 573a (logical), 573b (physical) between non-adjacent nodes (e.g., nodes F and D) can also be configured. In an example embodiment, the first backup communications paths 572 and 571 may be activated in an event of a link failure 570, and the second backup communications paths 574a (logical), 574b (physical), 573a (logical), 573b (physical) may be activated in an event of a node failure 575.

Any number of second backup communications paths 574a, 574b can be configured in a manner as described above in reference to FIGS. 5A and 5B, or as otherwise understood in the art, to support communications failures on communications links or nodes. A Virtual Private Local Area Network (LAN) Service (VPLS) connection may be used, or another form of multi-protocol label switching (MPLS) technique, may be used in accordance with example embodiments of the invention. Label Switched Paths (LSPs) may be configured as the communications paths 520, 574b, or other form of paths carrying communications supporting media 565 may be employed.

Figure 6:
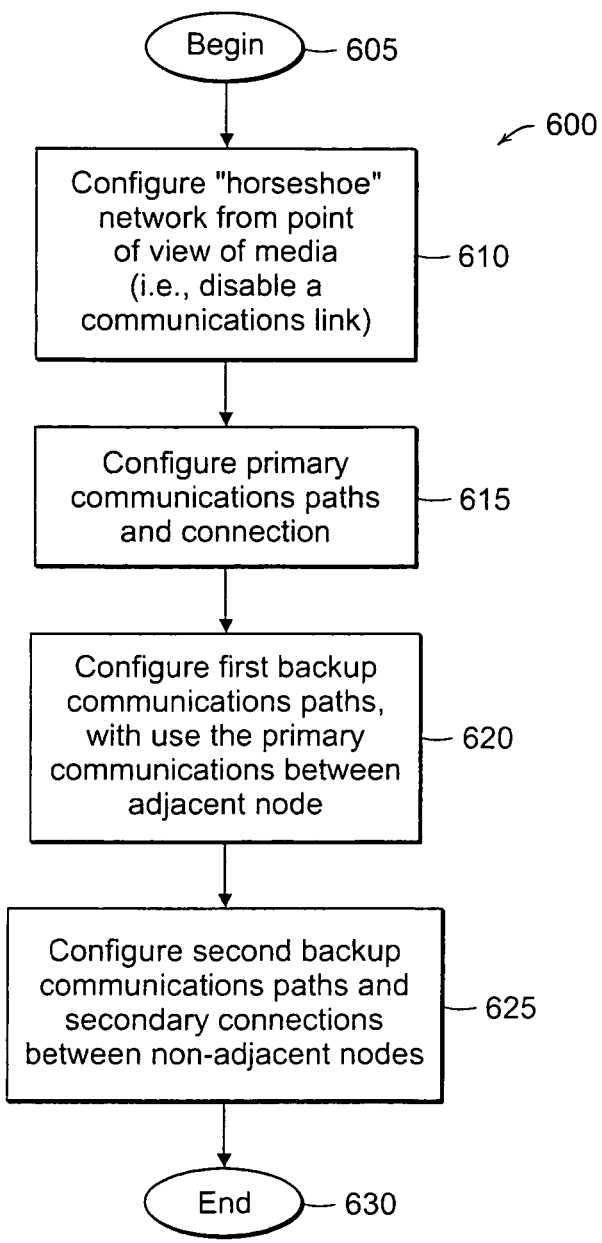
FIG. 6 is a flow diagram of an example embodiment of the present invention.

FIG. 6 is a flow diagram 600 illustrating aspects of an example embodiment of the invention. The flow diagram begins (605) and configures a "horseshoe" network topology from a point of view of at least some media (610). The "horseshoe" network topology is configured from a ring network by disabling a communications link between a selected pair of adjacent nodes. Primary communications paths and connections are configured (615). First backup communications paths, which use the primary connections, are configured between adjacent nodes (620). The second backup communications paths and secondary connections are configured between non-adjacent nodes (625). The flow diagram 600 ends (630), allowing typical network communications to occur with failover conditions facilitated by the first and second backup communications paths.

Figure 7:
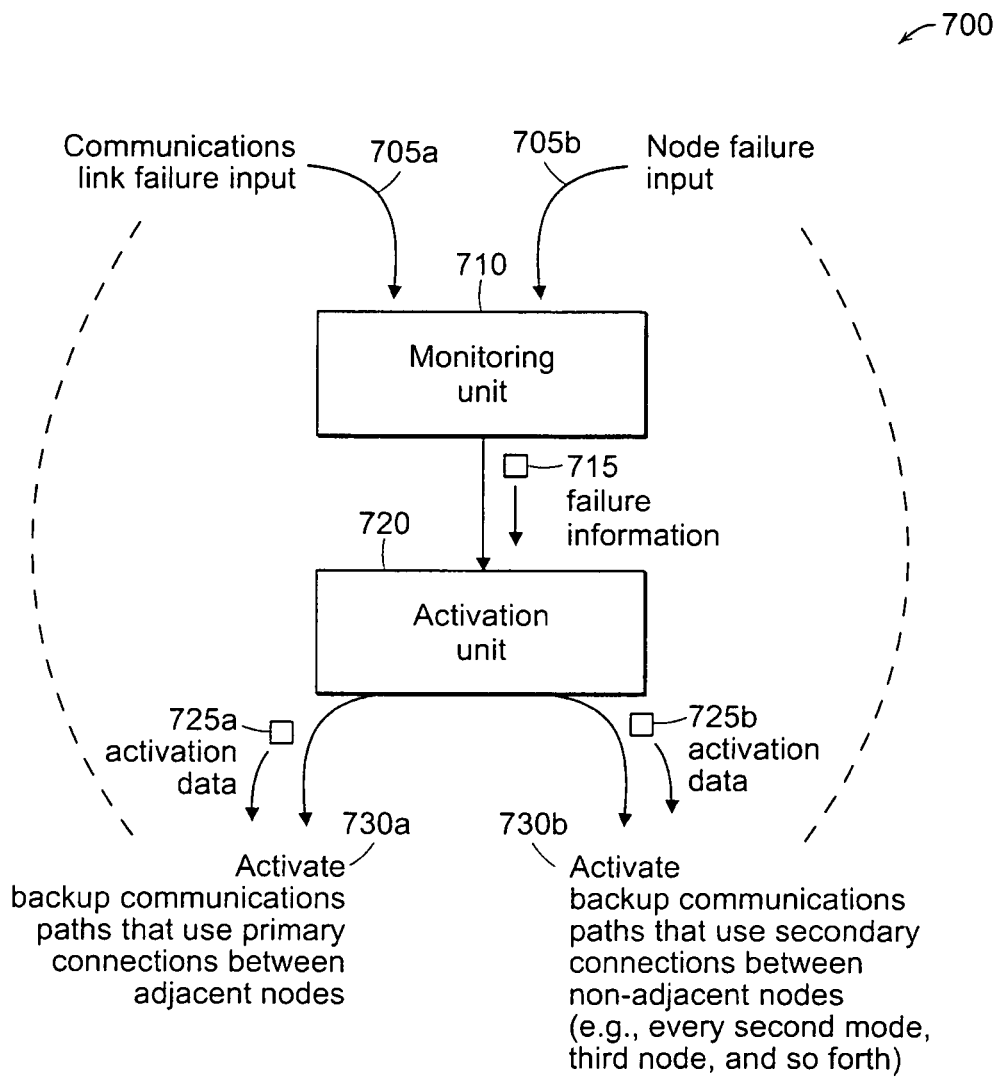
FIG. 7 is a block diagram illustrating example components that may be used in an example embodiment of the present invention.

FIG. 7 is a block diagram 700 illustrating an example embodiment of the invention in which a monitoring unit 710 and activation unit 715 may be employed during operation of a network. The monitoring unit 710 may receive a communications link failure input 705a and a node failure input 705b. It should be understood that the inputs 705a, 705b may be received on separate ports at the monitoring unit 710 or in a single port (not shown) in the monitoring unit 710.

The input 705a, 705b may be in the form of communications, error signals, or other typical network signals used for such a purpose. Moreover, the communications link failure input 705a or node failure input 705b may also be in the form of an absence of signals to the monitoring unit 710. Regardless, the monitoring unit 710, in an event of a failure, may send failure information 715 to the activation unit 720. In turn, the activation unit 720 may process the failure information 715 and determine whether to send activation data 725a or 725b to activate backup communications paths that use primary connections between adjacent nodes 730a or activate backup communications paths that use secondary connections between adjacent nodes (e.g., every second node, third node, and so forth) (730b).

It should be understood that the activation unit 720 may activate the backup communications paths independently, via signaling through a MPLS signaling protocol, provisioning channel, or other technique to activate the backup communications path(s). Moreover, the activation unit 720 may also be employed to re-enable the disabled link between the selected pair of adjacent nodes (e.g., nodes C and D 530b, 530a, respectively, in FIG. 5B) in accordance with the example embodiments described in reference to FIGS. 5A and 5B, or other figures described herein.

The monitoring unit 710 and activation unit 720 may be implemented in hardware, firmware, or software and may be employed in each node of a ring network, at a central data collection node of a ring network, or other node associated with a ring network. If implemented in software, the monitoring unit 710 and/or activation unit 720 may be stored on any form of computer-readable media in the form of processor instructions. The processor instructions can be loaded and executed by any form of custom or general processor adapted to operate in network configuration(s) as described herein. In one example embodiment, the monitoring unit 710 and activation unit 720 may be available in software that can be downloaded to some or all of the nodes of a ring network.

Figure 8:
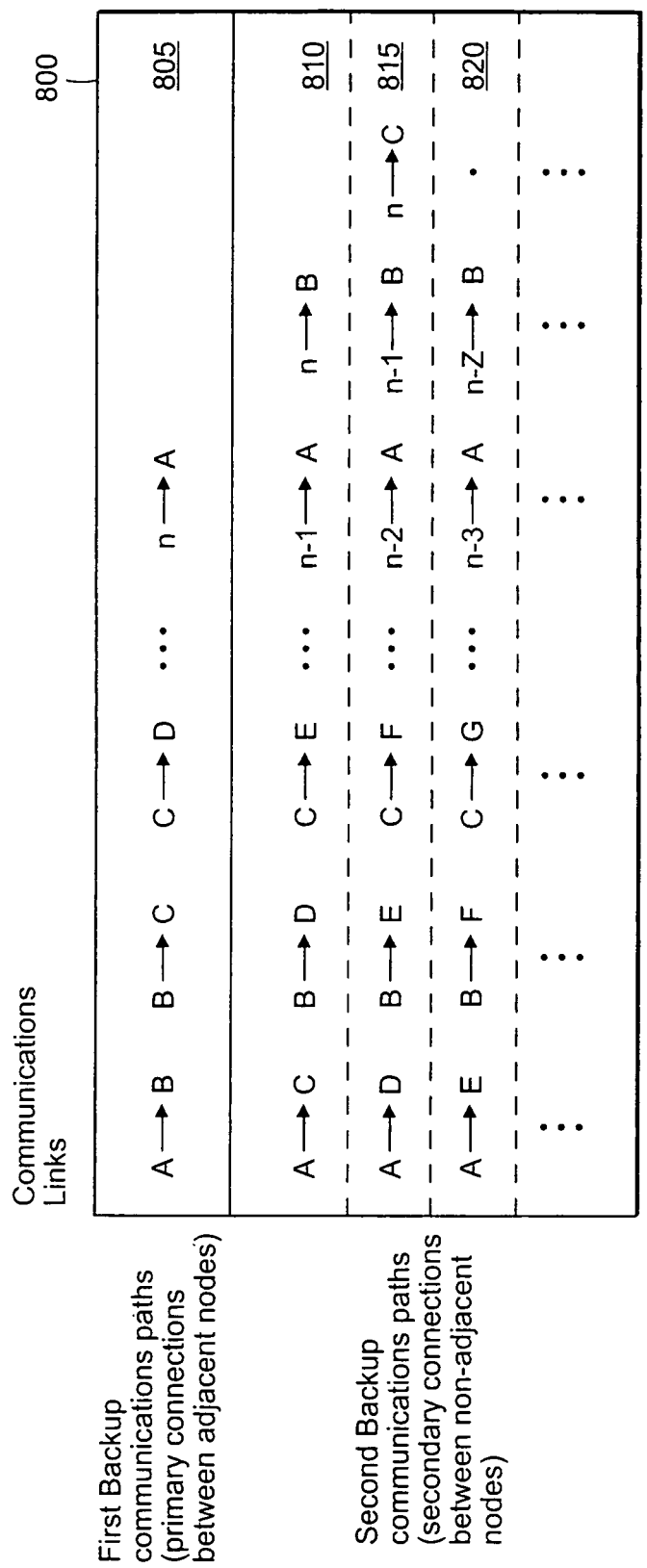
FIG. 8 is a table illustrating a hierarchy of backup communications paths optionally used in an example embodiment of the present invention.

FIG. 8 is an example table 800 stored in one or more nodes in a ring network, or associated with a ring network, that may be used to signal, provision, or provide instructions for manually configuring backup communications paths in an event of a communications link failure or a node failure in a link network.

First backup communications paths, which use primary connections between adjacent nodes, are indicated in the top row 805 of the table 800. As illustrated, node A has a first backup communications path to node B, node B has a first backup communications path to node C, node C has a first backup communications path to node D, . . . , and node n has a first backup communications path to node A, which completes the first backup communications path around the ring network. It should be understood that backup communications paths may also be found traversing the communications links of the ring network in the opposite direction (not shown for brevity).

The table 800 may also include an illustration of second backup communications paths, which use secondary connections between non-adjacent nodes, in the second row 810, third row, 815, fourth row 820, and so forth. As illustrated, one of the second backup communications paths (row 810) has a "skip one" methodology, the next lower row (row 815) of second backup communications paths has a "skip two" methodology, the next lower row (row 820) of second backup communications paths has a "skip three" methodology, and so forth.

The second backup communications paths can be preconfigured hierarchies of paths or hierarchies of paths that are determined during operation. The multiple levels of hierarchy (i.e., rows 805, 810, 815, and 820, and so forth) may be employed as needed in an increasing order as failures in a network occur. For example, if a communications link failure occurs, the first backup communications paths (row 805) may be activated. If a network node failure occurs, a "skip one" second backup communications path (row 810) may be activated. If two adjacent nodes fail, a "skip two" second backup communications path (row 815) methodology may be activated, and so forth.

While this invention has been particularly shown and described with references to example embodiments thereof, it will be understood by those skilled in the art that various changes in form and details may be made therein without departing from the scope of the invention encompassed by the appended claims.

What is claimed is:

1. A method of distributing media on a ring topology communications network, the method comprising:
   configuring multiple nodes and communications links to distribute media in a ring network;
   disabling distribution of the media on a first communications link between a selected pair of adjacent nodes in the ring network in a manner maintaining communications between the selected pair of adjacent nodes other than for distribution of the media;
   configuring a pair of adjacent head-end ingress nodes on the ring network to receive the media on separate communications paths from a node external from the ring network;
   disabling distribution of the media on a second communications link between the head-end ingress nodes; and
   configuring the pair of head-end ingress nodes on the ring network to distribute the media on the ring network in respective downstream directions between corresponding paths of the first and second communications links.

2. The method according to claim 1 further comprising distributing the media to the multiple nodes including the selected pair of adjacent nodes.

3. The method according to claim 1 wherein the head-end ingress nodes receive the media downstream from a head-end node that receives the media from the node external from the ring network.

4. The method according to claim 1 further comprising:
   adding the media to a head-end node on the ring network; and
   distributing the media from the head-end node in two downstream directions around the ring network other than on the communications link between the selected pair of adjacent nodes.

5. The method according to claim 1 wherein, in an event of a failure (i) in a communications link other than between the selected pair of adjacent nodes or (ii) of a node other than one of the selected adjacent nodes, enabling the communications link between the selected pair of adjacent nodes to distribute the media.

6. The method according to claim 1 further including in an event of a failure (i) of a communications link other than a communications link between the head-end ingress nodes or the selected pair of adjacent nodes in the ring network or (ii) a node other than a head-end ingress node in the ring network, enabling distribution of media on the communications link between the pair of head-end ingress nodes and the communications link between the selected pair of adjacent nodes.

7. The method according to claim 1 further including, in an event a head-end ingress node in the pair of head-end ingress nodes fails, enabling distribution of the media on the communications link between the selected pair of adjacent nodes.

8. The method according to claim 1 wherein configuring the multiple nodes and communications links includes employing a Virtual Private LAN Services (VPLS) to distribute the media.

9. The method according to claim 1 further comprising:
   configuring at least a subset of the nodes to drop the media locally; or
   running a protocol associated with respective nodes that determines if the media is to be dropped locally by the respective nodes.

10. The method according to claim 1 wherein configuring the multiple nodes includes signaling or provisioning Label Switched Paths (LSPs) between adjacent nodes.

11. The method according to claim 1 wherein configuring the multiple nodes and communications links includes configuring Layer 2 communications on the ring network.

12. The method according to claim 1 wherein disabling distribution of the media on the communications link between the selected pair of adjacent nodes defines a static logical break in the ring network.

13. The method according to claim 1 wherein the media includes video content.

14. The method according to claim 1, wherein the node external from the ring network is common to the pair of head-end ingress nodes.

15. A method according to claim 1, wherein the pair of adjacent head-end ingress nodes receives media with common content.

16. A network comprising:
   multiple nodes and communications links configured to distribute media in a ring network;
   a first communications link between a selected pair of adjacent nodes in the ring network disabled in a manner maintaining communications between the selected pair of adjacent nodes other than to distribute the media;
   a pair of adjacent head-end ingress nodes on the ring network coupled to a node external from the ring network via separate communications paths;
   a second communications link between the pair of head-end ingress nodes disabled from distributing the media; and the pair of adjacent head-end ingress nodes configured to add the media to the ring network in respective downstream directions, from head-end ingress nodes, on corresponding paths of the first and second communications links.

17. The network according to claim 16 wherein the multiple nodes distribute the media, including to the selected pair of adjacent nodes.

18. The network according to claim 16 wherein the selected pair of adjacent nodes receive the media downstream from a head-end node on the ring topology that receives the media from the node external from the ring network.

19. The network according to claim 16 further comprising a head-end node configured to add the media on the ring network and distribute the media in two downstream directions around the ring network other than on the communications link between the selected pair of adjacent nodes.

20. The network according to claim 16 wherein, in an event of a failure (i) in a communications link other than between the selected pair of adjacent nodes or (ii) of a node other than one of the selected adjacent nodes, the communications link between the selected pair of adjacent nodes is enabled to distribute the media.

21. The network according to claim 16 wherein, in an event of a failure (i) of a communications link other than a communications link between the head-end ingress nodes or the selected pair of adjacent nodes in the ring network or (ii) a node other than a head-end ingress node in the ring network, the communications link between the pair of head-end ingress nodes and the link between the selected pair of adjacent nodes are enabled to distribute the media.

22. The network according to claim 16 wherein, in an event one of the nodes of the pair of head-end ingress nodes fails, the communications link between the selected pair of adjacent nodes is enabled to distribute the media.

23. The network according to claim 16 wherein the multiple nodes and communications links are configured using Virtual Private LAN Services (VPLS) to distribute the media.

24. The network according to claim 16 wherein:
at least a subset of the nodes are configured to drop the media locally; or further comprising:
a protocol associated with respective nodes that determines that the media is to be dropped locally by the respective nodes.

25. The network according to claim 16 wherein the multiple nodes are provisioned using Label Switched Paths (LSPs) between adjacent nodes.

26. The network according to claim 16 wherein the multiple nodes and communications links are configured using Layer 2 communications on the ring network.

27. The network according to claim 16 wherein the communications link disabled between the selected pair of adjacent nodes defines a static logical break in the ring network.

28. The network according to claim 16 wherein the media includes video content.

29. The network according to claim 16 wherein the node external from the ring network is common to the pair of head-end ingress nodes.

30. A method according to claim 16, wherein the pair of adjacent head-end ingress nodes receives media with common content.

31. A method of distributing media on a ring topology communications network, the method comprising:
by a first head-end ingress node of a pair of adjacent head-end ingress nodes, distributing media, received from a head-end node via a first communications path, in a ring network toward a node of a selected pair of adjacent nodes in the ring network, the selected pair of adjacent nodes known to be maintaining communications between each other, the maintaining of the communications being other than for distribution of the media;
by the first head-end ingress node, disabling distribution of the media toward an adjacent, second, head-end ingress node of the pair of adjacent head-end ingress nodes, the second head-end ingress node receiving the media from the head-end node via a separate, second, communications path; and
by the first head-end ingress node, distributing enabling distribution of the media to the adjacent, second, head-end ingress node in an event of a disruption of communications between adjacent nodes on the ring network other than between the selected pair of adjacent nodes.

* * * * *